(12) United States Patent
Atkins et al.

(10) Patent No.: US 9,718,343 B2
(45) Date of Patent: Aug. 1, 2017

(54) ENERGY STORAGE SYSTEM HAVING A FLYWHEEL FOR A VEHICLE TRANSMISSION

(75) Inventors: Andrew Farquhar Atkins, Steyning (GB); Simon Shepherd, Leamington Spa (GB); Jonathan Davis, North Chailey (GB)

(73) Assignee: Ricardo UK Limited (GB)

( * ) Notice: Subject to any disclaimer, the term of this patent is extended or adjusted under 35 U.S.C. 154(b) by 723 days.

(21) Appl. No.: 14/112,672

(22) PCT Filed: Apr. 20, 2012

(86) PCT No.: PCT/GB2012/000373
§ 371 (c)(1),
(2), (4) Date: Dec. 12, 2013

(87) PCT Pub. No.: WO2012/143689
PCT Pub. Date: Oct. 26, 2012

(65) Prior Publication Data
US 2014/0103761 A1    Apr. 17, 2014

(30) Foreign Application Priority Data
Apr. 20, 2011    (GB) .................................. 1106768.3

(51) Int. Cl.
*H02K 7/02*    (2006.01)
*B60K 6/30*    (2007.10)
(Continued)

(52) U.S. Cl.
CPC ................ *B60K 6/30* (2013.01); *B60K 6/105* (2013.01); *B60L 11/16* (2013.01); *H02K 7/025* (2013.01);
(Continued)

(58) Field of Classification Search
CPC ........ H02K 7/025; H02K 7/11; H02K 7/1815; H02K 7/006; H02K 49/104; B60K 6/30;
(Continued)

(56) References Cited

U.S. PATENT DOCUMENTS 2,722,617 A    11/1955    Cluwen et al.
3,602,067 A    8/1971    Wetherbee, Jr.
(Continued)

FOREIGN PATENT DOCUMENTS

CN    101051773 A    10/2007
CN    101127465 A    2/2008
(Continued)

OTHER PUBLICATIONS

Machine translation of DE 102008023789 A1 (Nov. 2009).*
(Continued)

*Primary Examiner* — Michael Andrews
(74) *Attorney, Agent, or Firm* — Lerner, David, Littenberg,Krumholz & Mentlik, LLP

(57) ABSTRACT

An apparatus is provided comprising a flywheel (112) for storing kinetic energy and an electrical machine (190) mechanically coupled to the flywheel and arranged for conversion between mechanical and electrical energy. The apparatus is arranged for transferring energy between the flywheel and a vehicle transmission via a variable ratio transmission (182). The electrical machine is coupled to the flywheel via a disconnect clutch which comprises a magnetic coupling (116).

24 Claims, 19 Drawing Sheets

(51) Int. Cl.
  *B60K 6/10* (2006.01)
  *H02K 7/11* (2006.01)
  *H02K 7/18* (2006.01)
  *H02K 49/10* (2006.01)
  *H02K 51/00* (2006.01)
  *B60L 11/16* (2006.01)
  *B60K 6/26* (2007.10)
  *H02K 7/00* (2006.01)

(52) U.S. Cl.
  CPC ............. *H02K 7/11* (2013.01); *H02K 7/1815* (2013.01); *H02K 49/104* (2013.01); *H02K 51/00* (2013.01); *B60K 2006/262* (2013.01); *B60Y 2400/423* (2013.01); *B60Y 2400/608* (2013.01); *H02K 7/006* (2013.01); *Y02E 60/16* (2013.01); *Y02T 10/6204* (2013.01); *Y02T 10/6282* (2013.01); *Y02T 10/641* (2013.01); *Y02T 10/7027* (2013.01); *Y02T 10/7033* (2013.01)

(58) Field of Classification Search
  CPC ... B60K 6/105; B60K 2006/262; B60L 11/16; B60Y 2400/608; Y02E 60/16; Y02T 10/6204; Y02T 10/6282; Y02T 10/641; Y02T 10/7027; Y02T 10/7033
  USPC ............................ 310/74, 83, 99, 103, 104
  See application file for complete search history.

(56) References Cited

U.S. PATENT DOCUMENTS

| | | |
|---|---|---|
| 3,795,231 A | 3/1974 | Brille |
| 3,844,260 A | 10/1974 | Scott, Jr. et al. |
| 4,115,040 A | 9/1978 | Knorr |
| 4,123,949 A | 11/1978 | Knight, Jr. et al. |
| 4,183,259 A | 1/1980 | Giovachini et al. |
| 4,208,921 A | 6/1980 | Keyes |
| 4,233,858 A | 11/1980 | Rowlett |
| 4,277,707 A | 7/1981 | Silver et al. |
| 4,359,912 A | 11/1982 | Small |
| 4,414,805 A | 11/1983 | Walker |
| 4,588,040 A | 5/1986 | Albright, Jr. et al. |
| 4,625,135 A | 11/1986 | Kasabian |
| 4,629,947 A | 12/1986 | Hammerslag et al. |
| 4,660,435 A | 4/1987 | Davis et al. |
| 4,695,341 A | 9/1987 | Matuska et al. |
| 4,713,965 A | 12/1987 | Kobayashi |
| 4,767,378 A | 8/1988 | Obermann |
| 4,896,064 A | 1/1990 | Taiani |
| 5,165,305 A | 11/1992 | Veronesi |
| 5,214,358 A | 5/1993 | Marshall |
| 5,214,981 A | 6/1993 | Weinberger et al. |
| 5,285,699 A | 2/1994 | Walls et al. |
| 5,341,060 A | 8/1994 | Kawamura |
| 5,466,049 A | 11/1995 | Harmsen |
| 5,514,923 A | 5/1996 | Gossler et al. |
| 5,568,023 A | 10/1996 | Grayer et al. |
| 5,569,111 A | 10/1996 | Cho et al. |
| 5,633,555 A | 5/1997 | Ackermann et al. |
| 5,763,973 A | 6/1998 | Cramer |
| 5,767,595 A | 6/1998 | Rosen |
| 5,784,926 A | 7/1998 | Maass |
| 5,913,401 A | 6/1999 | Tamura et al. |
| 6,148,865 A | 11/2000 | Head |
| 6,211,597 B1 | 4/2001 | Nakano |
| 6,217,298 B1 | 4/2001 | Klaui |
| 6,347,925 B1 | 2/2002 | Woodard et al. |
| 6,440,055 B1 | 8/2002 | Meisberger |
| 6,441,581 B1 | 8/2002 | King et al. |
| 6,585,490 B1 | 7/2003 | Gabrys et al. |
| 6,604,360 B1 | 8/2003 | Vuk |
| 6,774,591 B2 | 8/2004 | Arimitsu et al. |
| 7,066,050 B1 | 6/2006 | Gabrys et al. |
| 7,263,912 B1 | 9/2007 | Gabrys et al. |
| 7,416,039 B1 | 8/2008 | Anderson et al. |
| 7,508,104 B2 | 3/2009 | Schmidt et al. |
| 7,740,092 B2 | 6/2010 | Bender |
| 8,183,722 B2 | 5/2012 | Akutsu et al. |
| 8,398,515 B2 | 3/2013 | Sartre et al. |
| 8,482,171 B2 | 7/2013 | Edwards |
| 2002/0006523 A1 | 1/2002 | Obeshaw |
| 2002/0174798 A1 | 11/2002 | Kumar |
| 2003/0098158 A1 | 5/2003 | George et al. |
| 2003/0098185 A1 | 5/2003 | Komeda et al. |
| 2004/0051507 A1 | 3/2004 | Gabrys et al. |
| 2004/0231629 A1 | 11/2004 | Linnig |
| 2005/0028628 A1 | 2/2005 | Liue |
| 2005/0040776 A1 | 2/2005 | Sibley |
| 2005/0150323 A1 | 7/2005 | Spears |
| 2005/0161304 A1 | 7/2005 | Brandl et al. |
| 2006/0175923 A1 | 8/2006 | Abou Akar et al. |
| 2006/0290218 A1 | 12/2006 | Shafer et al. |
| 2007/0101714 A1 | 5/2007 | Duesmann et al. |
| 2007/0241629 A1 | 10/2007 | Ionel et al. |
| 2008/0169720 A1 | 7/2008 | Petek |
| 2008/0176662 A1 | 7/2008 | Tateno et al. |
| 2008/0207336 A1 | 8/2008 | Yokoyama |
| 2009/0072647 A1 | 3/2009 | Hino et al. |
| 2009/0167101 A1 | 7/2009 | Saga et al. |
| 2010/0090552 A1 | 4/2010 | Bright |
| 2010/0156220 A1 | 6/2010 | Ekberg et al. |
| 2010/0176674 A1 | 7/2010 | Post |
| 2010/0231075 A1 | 9/2010 | Han et al. |
| 2010/0237629 A1 | 9/2010 | Gray |
| 2010/0259121 A1 | 10/2010 | Ueda et al. |
| 2011/0012458 A1 | 1/2011 | Atallah et al. |
| 2011/0023636 A1 | 2/2011 | Atkins et al. |
| 2011/0031827 A1 | 2/2011 | Gennesseaux |
| 2011/0057456 A1 | 3/2011 | Atallah et al. |
| 2011/0121672 A1 | 5/2011 | Calverley et al. |
| 2012/0060643 A1 | 3/2012 | Wiklof |
| 2012/0060644 A1 | 3/2012 | Morgan et al. |
| 2012/0097570 A1 | 4/2012 | Pinneo et al. |
| 2012/0190461 A1 | 7/2012 | Atkins |
| 2014/0210424 A1 | 7/2014 | Schroeder |

FOREIGN PATENT DOCUMENTS

| | | | |
|---|---|---|---|
| DE | 955524 C | 1/1957 | |
| DE | 2119015 A1 | 10/1972 | |
| DE | 2535790 A1 | 3/1976 | |
| DE | 2622295 A1 | 12/1977 | |
| DE | 2634918 A1 | 2/1978 | |
| DE | 2949125 A1 | 6/1981 | |
| DE | 3143845 A1 | 5/1983 | |
| DE | 3137197 A1 | 11/1983 | |
| DE | 3535394 A1 | 6/1986 | |
| DE | 19718480 A1 | 11/1997 | |
| DE | 202004011085 U1 | 9/2004 | |
| DE | 10321387 A1 | 12/2004 | |
| DE | 102008023789 | * 11/2009 | ............ B60K 6/105 |
| DE | 102008023789 A1 | 11/2009 | |
| EP | 0066040 A1 | 12/1982 | |
| EP | 161326 A1 | 11/1985 | |
| EP | 0212552 A2 | 3/1987 | |
| EP | 797863 A1 | 10/1997 | |
| EP | 822644 A1 | 2/1998 | |
| EP | 1102385 A2 | 5/2001 | |
| EP | 1353436 A2 | 10/2003 | |
| EP | 1447901 A2 | 8/2004 | |
| EP | 1906054 A1 | 4/2008 | |
| EP | 2133914 A2 | 12/2009 | |
| EP | 2180583 A1 | 4/2010 | |
| FR | 2574499 A1 | 6/1986 | |
| FR | 2756118 A1 | 5/1998 | |
| FR | 2766027 A1 | 1/1999 | |
| GB | 745911 A | 3/1956 | |
| GB | 1340362 A | 12/1973 | |
| GB | 1385423 A | 2/1975 | |
| GB | 1433748 A | 4/1976 | |
| GB | 1443530 A | 7/1976 | |
| GB | 1516862 A | 7/1978 | |

(56) References Cited

FOREIGN PATENT DOCUMENTS

| | | | | |
|---|---|---|---|---|
| GB | 2062112 | A | 5/1981 | |
| GB | 2078016 | A | 12/1981 | |
| GB | 2237339 | A | 5/1991 | |
| GB | 2297870 | A | 8/1996 | |
| GB | 2400410 | A | 10/2004 | |
| GB | 2437568 | A | 10/2007 | |
| GB | 2448598 | A * | 10/2008 | ............ H02K 7/025 |
| GB | 2457682 | A | 8/2009 | |
| GB | 2462489 | A | 2/2010 | |
| JP | 48053200 | | 7/1973 | |
| JP | 55-082836 | | 6/1980 | |
| JP | 57-097940 | | 6/1982 | |
| JP | 57-200746 | | 12/1982 | |
| JP | 58-217843 | | 12/1982 | |
| JP | 58-217842 | | 12/1983 | |
| JP | 59153459 | | 9/1984 | |
| JP | 60125456 | | 7/1985 | |
| JP | 61-099738 | | 5/1986 | |
| JP | 61-140638 | | 6/1986 | |
| JP | 61173662 | A | 8/1986 | |
| JP | 61-281933 | | 12/1986 | |
| JP | 04-128622 | A | 4/1992 | |
| JP | 04362226 | A | 12/1992 | |
| JP | 06261421 | | 9/1994 | |
| JP | 07264838 | | 10/1995 | |
| JP | 09074777 | | 3/1997 | |
| JP | 09-317827 | | 12/1997 | |
| JP | H10306831 | A | 11/1998 | |
| JP | 2001041257 | A | 2/2001 | |
| JP | 2001268706 | A | 9/2001 | |
| JP | 2001-286007 | A | 10/2001 | |
| JP | 2003165361 | A | 6/2003 | |
| JP | 2004211754 | A | 7/2004 | |
| JP | 2005-295711 | A | 10/2005 | |
| JP | 2005315370 | A | 11/2005 | |
| JP | 05168222 | B2 | 3/2013 | |
| NL | 8501670 | A | 1/1987 | |
| SU | 582429 | A1 | 11/1977 | |
| SU | 664074 | A1 | 5/1979 | |
| SU | 1420268 | A1 | 8/1988 | |
| WO | 9619035 | A1 | 6/1996 | |
| WO | 9715110 | A1 | 4/1997 | |
| WO | 00/74203 | A1 | 12/2000 | |
| WO | 0147091 | A1 | 6/2001 | |
| WO | 2005064777 | A1 | 7/2005 | |
| WO | 2006/121761 | A2 | 11/2006 | |
| WO | 2007029905 | A2 | 3/2007 | |
| WO | 2007107691 | A1 | 9/2007 | |
| WO | 2007135360 | A1 | 11/2007 | |
| WO | 2007/138353 | A2 | 12/2007 | |
| WO | 2007144556 | A1 | 12/2007 | |
| WO | 2008076694 | A2 | 6/2008 | |
| WO | 2009/010819 | A1 | 1/2009 | |
| WO | 2009071922 | A2 | 6/2009 | |
| WO | 2009087408 | A2 | 7/2009 | |
| WO | 2009087409 | A1 | 7/2009 | |
| WO | 2009/148918 | A2 | 12/2009 | |
| WO | 2010094912 | A1 | 8/2010 | |
| WO | 2010109208 | A1 | 9/2010 | |
| WO | 2010109209 | A1 | 9/2010 | |
| WO | 2010109210 | A1 | 9/2010 | |
| WO | 2011048133 | A1 | 4/2011 | |
| WO | 2011048141 | A1 | 4/2011 | |
| WO | 2011061496 | A2 | 5/2011 | |
| WO | 2012066106 | A1 | 5/2012 | |

OTHER PUBLICATIONS

Chinese Office Action for Application No. 201080022351.2 dated Apr. 9, 2013.
Extended European Search Report for Application No. 13174994.7 dated Sep. 9, 2013.
Japanese Office Action for Application No. 2012-501384 dated Dec. 24, 2013.
British Search and Examination Report for Application No. GB1310874.1 dated Jul. 21, 2013.
British Search and Examination Report for Application No. GB1310875.8 dated Jul. 21, 2013.
British Search and Examination Report for Application No. GB1310876.6 dated Jul. 21, 2013.
Chinese Office Action for Application No. 201080022344.2 dated Mar. 4, 2013.
GB Search Report issued in corresponding application No. GB0918384.9, dated Jan. 29,2010,4 pages.
International Search Report and Written Opinion for Application No. PCT/GB2012/000373 dated Aug. 7, 2012.
International Search Report from PCT/GB2008/004050 dated May 27, 2009 (7 pages).
International Search Report from PCT/GB2010/000590 dated Aug. 3, 2010 (3 pages).
International Search Report from PCT/GB2010/000591 dated Aug. 3, 2010 (3 pages).
International Search Report from PCT/GB2010/000592 dated Aug. 3, 2010 (3 pages).
International Search Report from PCT/GB2010/002124 dated Apr. 17, 2012 (3 pages).
International Search Report issued in PCT/EP2010/065781, mailed Dec. 28, 2010,7 pages.
International Search Report issued in PCT/EP2010/065791, mailed Mar. 23, 2011,8 pages.
International Search Report issued in PCT/EP2011/070410 mailed on Mar. 13, 2012 (2 pages).
Search Report issued in corresponding application GB0918386.4. dated Jan. 27, 2010.4 pages.
Written Opinion from PCT/GB2008/004050 dated May 27, 2009 (10 pages).
Written Opinion from PCT/GB2010/000590 dated Aug. 3, 2010 (6 pages).
Written Opinion from PCT/GB2010/000591 dated Aug. 3, 2010 (6 pages).
Written Opinion from PCT/GB2010/000592 dated Aug. 3, 2010 (8 pages).
Written Opinion from PCT/GB2010/002124 (8 pages).
Written Opinion issued in PCT/EP2010/065781, mailed Dec. 28, 2010,7 pages.
Written Opinion issued in PCT/EP2010/065791, mailed Mar. 23, 2011, 10 pages.
Written Opinion of the International Searching Authority issued in PCT/EP2011/070410 mailed on Mar. 13, 2012 (6 pages).

* cited by examiner

ENERGY STORAGE SYSTEM HAVING A FLYWHEEL FOR A VEHICLE TRANSMISSION

This invention relates to a flywheel energy storage apparatus and a method of controlling energy flow.

BACKGROUND OF THE INVENTION

The conservation and optimal use of energy is a key consideration in the manufacture and running of modern vehicles and machinery. There is an increasing user demand for efficiency and for obtaining the best possible output at the lowest possible cost to the user. Considerations in this cost/output balance include both financial and environmental factors. In addition, there is a demand for improved power and speed from vehicles and machinery, whilst at the same time a desire to provide a comfortable and user friendly feel. Furthermore, there is a trend for engines, motors and other equipment to become ever more compact and streamlined.

There are many known approaches for dealing with the above discussed balance. For example, as user demand for environmentally friendly vehicles grows and the regulations on carbon emissions become ever stricter, hybrid vehicles are becoming more popular. As will be known to the skilled reader, hybrid vehicles use a combination of two or more different power sources to move a vehicle or otherwise power machinery. In the field of motor vehicles, the most common hybrid is a hybrid electric vehicle (HEV) which combines an internal combustion engine (ICE) with one or more electric motors. Depending on the power demand at any given time, one or both of the ICE and the electric motor will be deployed to provide power to the vehicle's outputs. A chemical energy storage system is provided in conjunction with the electric motor so that, during periods when the electric motor is not being used to power vehicle output, it can instead operate as a generator to create and store charge in the chemical energy storage system for later use. Known chemical energy storage systems can be made up of a single type of chemical cell or can comprise any combination of cells having differing chemical formulations. All such chemical energy storage systems are designated herein as being a chemical "battery".

Problems exist with known hybrid systems since the high cycling frequency of the hybrid battery system charge level caused by, for example, regenerative braking and recovery during a typical vehicle usage scenario and the high power flows associated with these operations accelerate the deterioration of battery health, thereby limiting the system life. Warranty is thus often limited on batteries in conventional hybrid systems. Typically, the chemical battery may have to be changed twice during the lifetime of known hybrid electric vehicles. Furthermore, battery cycling may be limited by protective control systems which control distribution of power supply and/or charging in a hybrid system. An effect of this protective limiting is to impair the $CO_2$ reduction efficacy of the corresponding hybrid system.

Flywheels are known for the storage of energy in the form of kinetic energy, for example for use in vehicles. It is known to use a flywheel to store the energy which would otherwise be converted to heat in a vehicle's braking system when the vehicle decelerates, this stored energy then being available for use to accelerate the vehicle when desired. However, a problem with existing flywheel implementations remains that of how to charge the flywheel initially and at points of low energy therein.

Another problem with existing flywheel implementations is that when, for example, a vehicle is brought to rest and the engine (e.g. an Internal Combustion Engine or ICE) is switched off, the flywheel remains rotating and charged with kinetic energy. This kinetic energy is gradually lost as the flywheel rotation speed gradually decreases due to friction, thus energy recovery efficiency is compromised.

A further problem with existing flywheel implementations is that under regenerative conditions, e.g when a vehicle is slowing down, if the flywheel is already rotating at or near maximum speed then further charging of the flywheel can result in dangerous operating speeds, and possibly failure of the flywheel. A way of avoiding this possibility without wasting potentially recoverable energy is therefore desirable.

A further problem with existing flywheel implementations is that after a sustained acceleration event, most of the flywheel's energy will have been used to aid acceleration, and the flywheel speed will be consequently reduced to at or near its minimum speed. If a subsequent acceleration event occurs before a significant regeneration event occurs, the flywheel will contain little energy for use in aiding the subsequent acceleration. Thus, the subsequent acceleration attempt will suffer from stunted performance compared to the first acceleration event (when the flywheel was in a relatively fully charged state). Such unpredictability of performance is undesirable and could even be dangerous, for example when an overtaking manoeuvre is being attempted.

A further problem with some existing flywheel implementations is that stored flywheel energy is dissipated over time due to frictional losses. A way of reducing such losses is desirable.

As discussed above, in order to optimally balance cost and output in a vehicle or machine it is desirable to harness as much of the available energy as possible and to prevent energy merely being dissipated as, for example, heat energy. Hence there is an ongoing requirement for apparatus and methods that optimise use of energy in vehicles and other machinery whilst at the same time not compromising on user-important factors such as comfort, cost effectiveness and environmental friendliness.

An invention is set out in the claims.

SUMMARY

In a first aspect there is provided a method of operating energy storage apparatus, the apparatus comprising a vehicle transmission which is mechanically couplable to a flywheel to drive the flywheel and be driven thereby, and an electrical machine which is also mechanically couplable to the flywheel to drive the flywheel and be driven thereby, the electrical machine electrically connected to electrical energy storage means, the method comprising the steps of before operation of a vehicle comprising the apparatus, spinning up the flywheel by operating the electrical machine as a motor to discharge the electrical energy storage means; and/or after operation of the vehicle, spinning down the flywheel by operating the electrical machine as a generator to charge the electrical storage means.

In a second aspect there is provided a method of operating energy storage apparatus, the apparatus comprising a vehicle transmission which is mechanically couplable to a flywheel to drive the flywheel and be driven thereby, and an electrical machine which is also mechanically couplable to the flywheel to drive the flywheel and be driven thereby, the electrical machine electrically connected to electrical energy storage means, the method comprising the steps of: operating the electrical machine as a motor to discharge the electrical storage means whilst coupling the electrical machine to the vehicle transmission to provide power to the vehicle transmission; and coupling the flywheel to the vehicle transmission to provide additional power to the vehicle transmission or to absorb excess power from the vehicle transmission.

Optionally, providing power to the vehicle transmission from the flywheel is performed during peak power demand by the vehicle transmission. Optionally, peak power demand occurs during acceleration of a vehicle comprising the vehicle transmission, or when the vehicle is travelling up an incline.

Optionally, absorbing excess power from the vehicle transmission is performed during braking of a vehicle comprising the vehicle transmission, or when the vehicle is travelling down an incline.

In a third aspect there is provided a flywheel energy storage system comprising: a flywheel for storing kinetic energy, the system arranged for mechanically transferring energy between the flywheel and a vehicle transmission via a variable-ratio transmission; and the system further comprising an electrical machine mechanically coupled to the flywheel and arranged for conversion between mechanical energy in the flywheel and electrical energy.

In a fourth aspect there is provided a flywheel interface module for coupling between a flywheel and a vehicle transmission, the module arranged for mechanically transferring energy between the flywheel and the vehicle transmission via a variable-ratio transmission; and the module further comprising an electrical machine mechanically coupled to the flywheel and arranged for conversion between mechanical energy in the flywheel and electrical energy.

Optionally, the variable ratio transmission is a continuously variable or infinitely variable transmission unit.

Optionally, the electrical machine is coupled to the flywheel via first and second gears. Optionally, the electrical machine is concentrically arranged on the flywheel. Optionally the electrical machine is coupled to a layshaft of the variable ratio transmission. Optionally, the variable ratio transmission is connected to the flywheel via third and fourth gears.

Optionally, the flywheel is connected to a mechanical coupling member which is longitudinally split into two or more sections, with a disconnect clutch selectively coupling the split sections. Optionally a first clutch separates the flywheel from the electrical machine such that the flywheel can rotate independently of the electrical machine and the primary and secondary gears. Optionally, a second clutch separates the electrical machine from the variable-ratio transmission, such that the flywheel can rotate with the electrical machine and independently of the variable-ratio transmission.

In a fifth aspect there is provided a method of operating a flywheel energy storage system, the system comprising: a flywheel for storing kinetic energy, the system arranged for energy transfer to and from the flywheel by a mechanical coupling member; the method comprising operating an electrical machine as a motor or a generator to convert between energy stored in the flywheel and energy stored in electrical storage means.

Optionally, the flywheel is pre-charged shortly after vehicle switch-on. Optionally, the flywheel is charged using stored electrical energy during periods when there is substantially little or no energy being supplied to the flywheel from the vehicle transmission.

In a sixth aspect there is provided a method of operating a flywheel energy storage system according to the second aspect, the method further comprising charging the electrical energy storage means using output power from the electrical machine which is rotated by the flywheel.

Optionally, the electrical energy storage means is charged by the electrical machine operating as a generator, so as to at least partially absorb the excess power from the vehicle transmission.

In a seventh aspect there is provided a method of operating a energy storage apparatus according to any preceding aspect, the apparatus further comprising at least one disconnect-type clutch having two selectively engageable halves, the method further comprising controlling the rotational speed of at least one half of the clutch by operating the electrical machine as a motor or generator, so as to synchronise the two halves of the clutch.

Optionally, the synchronisation is performed before the at least one clutch is engaged. Optionally, the clutch is a dog-engagement type. Optionally, the clutch is a frictional engagement type. Optionally, the clutch is a magnetically engaging type.

Optionally, coupling the electrical machine to the vehicle transmission is performed using a variable-ratio transmission.

Optionally the flywheel runs in a vacuum. Optionally, the electrical machine is at least partially integrated with the flywheel. Optionally, the rotor of the electrical machine is integrated with the flywheel and runs in a vacuum with the flywheel.

By providing an auxiliary electrical machine, coupled to the flywheel, it is possible to use stored battery power to pre-charge (spin-up) the flywheel at startup, and re-charge the flywheel after an acceleration event. It is also possible to use flywheel energy to run auxiliary electrical devices (for example, in place of a conventional car alternator), return stored flywheel energy to the battery for long-term storage (rather than simply losing the stored flywheel energy after switch-off due to friction) so as to increase efficiency, and also to limit flywheel charging during regeneration in cases where the flywheel is already fully charged (excess energy can be returned to the battery, rather than being wasted as heat as would be the case if friction brakes were resorted to instead of regeneration).

Because the primary path for carrying energy to/from the flywheel (the path carrying the most power) is purely mechanical, there is no loss in efficiency associated with conversion of energy from one form to another (e.g. electrical to mechanical). Greater efficiency results.

Furthermore, by providing a disconnect-type clutches (for example, between the flywheel and the transmission), frictional losses are reduced so that the flywheel maintains its charge for longer and is more efficient.

In an eighth aspect there is provided an apparatus comprising: a flywheel for storing kinetic energy, the apparatus arranged for mechanically transferring energy between the flywheel and a vehicle transmission via a variable-ratio transmission. The apparatus further comprises an electrical machine mechanically coupled to the flywheel and arranged for conversion between mechanical energy and electrical energy. The electrical machine is coupled to the flywheel via a disconnect clutch that comprises a magnetic coupling.

The flywheel may be connected to a mechanical coupling member which is longitudinally split into two or more sections, wherein the disconnect clutch selectively couples the split sections. The disconnect clutch may comprise a first clutch that separates the flywheel from the electrical machine such that the flywheel can rotate independently of the electrical machine. A second clutch may further be provided to separate the electrical machine from the variable-ratio transmission, such that the flywheel can rotate with the electrical machine and independently of the variable-ratio transmission.

Each of said first clutch and said second clutch may be a magnetically engaging type clutch, comprising a magnetic coupling.

The apparatus may further comprise an electromagnet, wherein said electromagnet is arranged for application of an external magnetic field to the magnetic coupling comprised within the disconnect clutch.

In a ninth aspect there is provided a method of operating an apparatus, said apparatus comprising a flywheel for storing kinetic energy, wherein the apparatus is arranged for transferring energy between the flywheel and a vehicle transmission via a variable-ratio transmission. The apparatus further comprises an electrical machine mechanically coupled to the flywheel and arranged for conversion between mechanical energy and electrical energy, wherein the electrical machine is coupled to the flywheel via a disconnect clutch, said disconnect clutch comprising a magnetic coupling. The method comprises storing kinetic energy in the flywheel and selectively disconnecting the flywheel from other parts of the apparatus, wherein said other parts comprise the electrical machine and/or the variable-ratio transmissions. The step of selectively disconnecting the flywheel comprises desynchronising the rotation of first and second parts of the magnetic coupling from one another.

The first part of the magnetic coupling may comprise a low speed rotor and the second part of the magnetic coupling may comprise a high speed rotor, wherein the step of desynchronising the rotation of the first and second parts of the magnetic coupling from one another comprises reducing the rotational speed of the low speed rotor below a threshold, wherein said speed reduction is achieved by applying a torque to the magnetic coupling. The torque may exceed the dynamic torque capacity for the magnetic coupling. The torque may be applied to the magnetic gear by any of: the electrical machine, the variable ratio transmission, a brake or a clutch.

The method may further comprise applying an external magnetic field to the magnetic gear during desynchronisation of the first and second parts of the magnetic coupling from one another instantaneously or for a finite period of time, which may be predetermined. The external magnetic field may be produced using an electromagnet.

The step of desynchronising rotation of the first and second parts of the magnetic coupling from one another may be achieved by influencing a magnetic field produced by the magnetic coupling using a ferromagnetic shield.

The first and second parts of the magnetic coupling may comprise first and second rotators with a common rotational axis, wherein the step of desynchronising rotation of the first and second parts of the a magnetic coupling from one another is achieved by physically separating the rotators from one another along said axis, in order to reduce their torque capacity.

The apparatus may comprise a first disconnect clutch between the electrical machine and the flywheel and a second disconnect clutch between the electrical machine and the variable ratio transmission, wherein the method comprises selectively disengaging the first clutch and/or the second clutch during operation of the apparatus. Each of said first disconnect clutch and said second disconnect clutch comprise a magnetic coupling.

The method may further comprise the step of resynchronising the first and second parts of the magnetic coupling with one another in order to reconnect the flywheel to other parts of the apparatus.

DESCRIPTION OF FIGURES

Embodiments will now be described by way of example only with reference to the Figures of which:

FIG. 8a shows a possible engine configuration for flywheel torque fill-in;

FIG. 8b shows another, similar arrangement for flywheel torque fill-in;

FIG. 8c shows a further, similar arrangement for flywheel torque fill-in;

FIG. 8d shows a possible control scheme for flywheel torque fill-in

FIG. 14b is a close-up view of the circled section in FIG. 14a.

OVERVIEW

Figure 1:
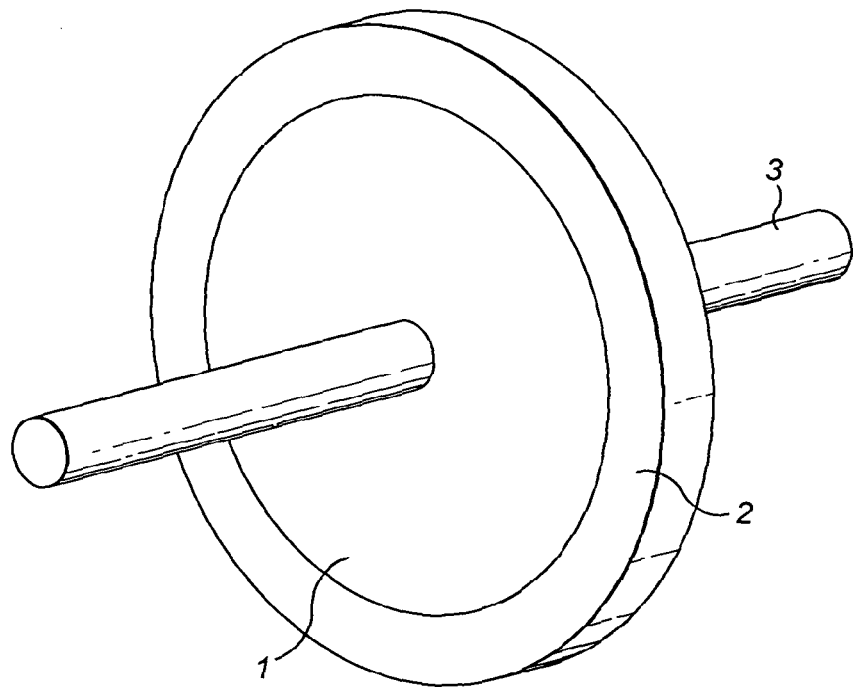
FIG. 1 shows a known flywheel arrangement.

In overview, an apparatus, method and control scheme are provided for using a flywheel mechanical battery in conjunction with a chemical battery in order to supply energy to a common load. The load may be an electric motor, for example arranged in a hybrid electric vehicle. Although any suitable load may have energy supplied thereto by a combination of the mechanical flywheel battery and chemical battery.

Dependent on instantaneous operating conditions, in particular the power requirements for the load at any given time, a suitable combination of mechanical and chemical battery will be used for energy supply. In particular, the mechanical flywheel battery is suited to high power, high speed energy cycling. In contrast, a chemical battery is better suited to low power operation and slower, long term charging or energy supply. Unlike a chemical battery, a flywheel battery does not deteriorate significantly as a result of high power flows or high cycling frequency. Therefore the mechanical flywheel battery can be predominantly used in high power, high cycling frequency conditions during use, in order to lighten the burden on the chemical battery and reduce the deterioration over time of the chemical battery.

The flywheel battery can be charged by energy recovered from the load to which it is arranged to supply energy at other times during operation. The chemical battery can be similarly charged by the load. Alternatively or additionally, the mechanical battery and chemical battery can charge one another. Furthermore, both batteries may be charged by other, external sources. For example the chemical battery may be plugged in for charging. The flywheel may be charged up initially and at other times during operation using any suitable energy source, for example exhaust gas energy and/or using power from a vehicle driveline or power train.

A controller is provided to control and manipulate the flow of energy between the load and the chemical and mechanical batteries. The controller acts to optimise efficiency in the system, making the best possible use of the energy cycling characteristics of the two battery types. Preferably the controller selects predominately the chemical battery for use in low power, low cycling frequency situations whereas it selects predominately the mechanical battery including the flywheel for use in high power, high cycling frequency situations. The controller may also exert other-restrictions on the system, for example controlling operation so that each battery maintains a minimum threshold of charge at all times. Furthermore, if instantaneous power requirements from the load cannot be met by the available mechanical and chemical batteries at that time, the controller can prioritise the aspect of the load to which energy is supplied and/or may extract energy from other sources within the vehicle, engine machine or apparatus in which the parallel mechanical and chemical batteries are provided.

An "Electrical power take-off" concept described below as an embodiment, under the heading "Electrical Charging/Discharging", provides an alternative energy path for mechanical flywheel kinetic energy recovery systems, providing extended functionality and efficiency. In brief, the concept includes integration of an electric machine into a flywheel hybrid transmission system incorporating a variable ratio transmission, to support flywheel pre-charge, flywheel discharge-to-battery, flywheel charge maintenance and transmission synchronisation. Disengagement clutches are used in combination with a mechanism to re-synchronise the elements following a disconnect, to allow reconnection. The use of re-synchronisation techniques allows the use of low-drag disconnect devices so as to minimise self-discharge in the flywheel system. The use of recovered energy to run electrically-powered auxiliary devices is also described below. Applications include passenger cars, commercial trucks and buses. Off-highway applications, static plant and rail applications are also envisaged.

As will be described, the described electrical power take-off module (also called an ePTO machine) is capable of providing electrical energy to the flywheel and of taking electrical energy from the flywheel. It is thereby capable of providing starting torque to "spin-up" the flywheel system, at startup. The flywheel charge can be maintained during operation in a similar way. The module can also provide for electrical energy generation on shut-down or during operation, to charge the vehicle battery or to supply other electrical energy sinks. The electrical machine can also be used by the controller to accelerate or retard the variable ratio transmission, which is optionally selectively coupled to the flywheel by one or more disconnect clutches. Thereby, the module also provides the capability to synchronise the mechanical hybrid transmission with the flywheel following a clutch disconnect and in preparation for a clutch re-connect. The ePTO machine preferably has as low as possible frictional spin losses when not in use, and incorporates an electrical machine which can be of any electrical architecture which meets the above functional requirements. The electrical machine can also be used to remove and electrically store energy from the transmission, energy which would otherwise have accelerated the flywheel, so as to limit flywheel charge during operation. This also allows for a further reduction in the need to use friction brakes for retardation of a vehicle equipped with the flywheel and ePTO module increasing regeneration efficiency.

It is possible for one or both of the clutches within the ePTO module to comprise a magnetic coupling. A magnetic coupling may comprise a magnetic gear having first and second rotators arranged to rotate at a relatively low speed and a relatively high speed respectively, preferably wherein one rotator is provided within a vacuum along with the flywheel and the other rotator is provided distal to the flywheel, on the airside. In order to disengage the clutch (or clutches) and thereby to isolate the flywheel from other parts of the system, the first and second rotators within the magnetic coupling can be desynchronised from one another. This desynchronisation can be achieved using a brake, a clutch, the electrical machine within the ePTO module or the variable transmission to which the ePTO module connects. An external magnetic field may be applied to the magnetic coupling either solely to achieve desynchronisation of the rotators within the coupling or to reduce noise during such desynchronisation.

DETAILED DESCRIPTION

FIG. 1 shows a typical existing flywheel arrangement. A substantially circular central metallic support section 1 can be axially mounted on a central support such as a shaft 3. At least one composite ring 2 is mounted on the central support section 1. In the flywheel shown in FIG. 1, the composite ring 2 is filament wound from carbon fibre. As will be known to the skilled person, and as discussed above, a flywheel device such as the one shown in FIG. 1 can be used as a mechanical battery to store kinetic energy for use, for example, within a motor vehicle.

Examples of related technologies which can be applied to such a vehicle will first be described, followed by a description of an embodiment.

Exhaust-Driven Flywheel

Another example approach for optimising energy supply and its conversion from the stored chemical energy to torque, particularly in ICE powered motor vehicles is the use of turbochargers and superchargers. As will be known to the skilled person, turbochargers recover exhaust energy to drive a compressor and increase inlet charge pressure to an engine. Supercharger devices use engine delivered torque to drive compressors to also boost the inlet charge pressure. However, both these devices have associated disadvantages in practice. Turbochargers, as passive devices, are only operable when there is sufficient exhaust mass flow to drive the boosting system. Superchargers, by contrast, are active devices since they are generally crank driven and consequently do not suffer from such operational limitations as turbochargers do. However superchargers do introduce parasitic losses of engine power, thereby reducing their overall efficacy in terms of reducing fuel consumption.

Figure 2:
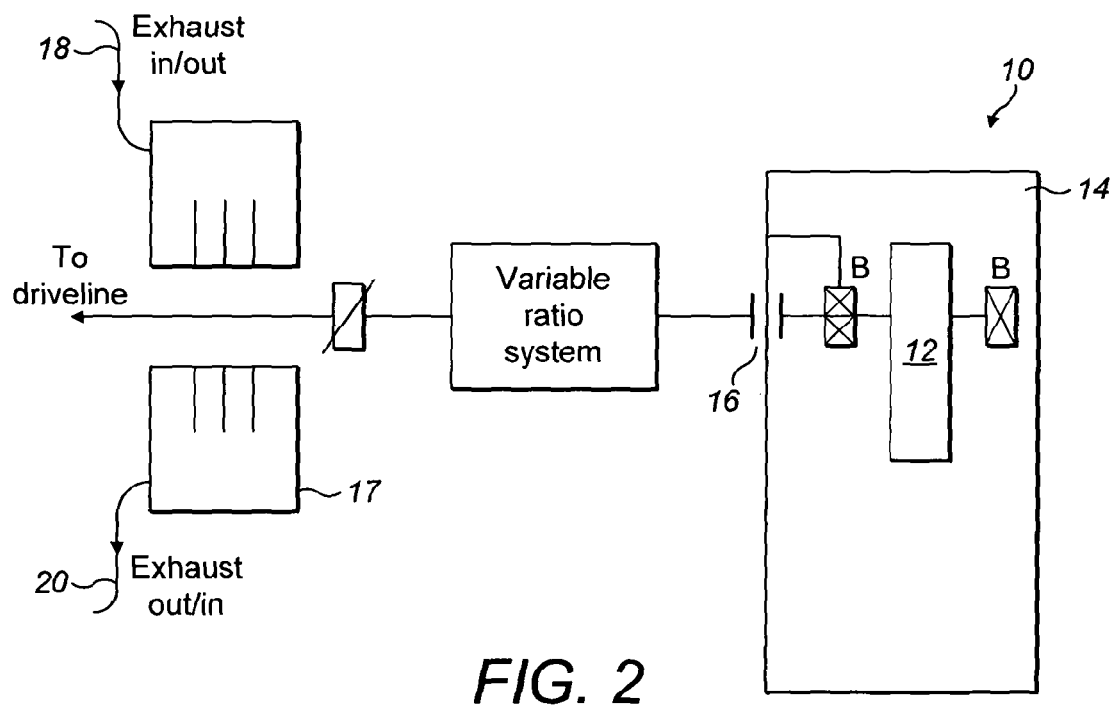
FIG. 2 shows a possible configuration for providing exhaust gas energy to a flywheel.

FIG. 2 shows, by way of example, a possible arrangement for providing energy to a flywheel in a vehicle for storage. The system 10 includes a flywheel 12 preferably arranged in a vacuum 14, in order to optimise operation of the flywheel 10 by removing the friction that would otherwise be caused by air resistance. Outside the vacuum 14, in connection with the flywheel 12, is a clutch 16. The clutch 16 employed may be a simple clutch of any suitable type, even a magnetic clutch.

In order to provide energy to and initially drive the flywheel 12, and/or to top up charge in the flywheel battery system, an input 18 is provided to the flywheel 12 via the clutch 16. The input channels exhaust gas energy from the combustion engine of the vehicle in which the flywheel system 10 is provided to the flywheel 12, and enables that exhaust gas energy to be stored in the flywheel 12. The arrangement also includes a suitable output 20 for the exhaust gas, such that supply of exhaust gas energy to the flywheel 12 can be manipulated and controlled.

It will be appreciated that the majority of the exhaust gas created in a vehicle is conventionally released to the atmosphere. This wastes the energy within the exhaust gas by releasing it from the vehicle rather than reusing it. Therefore the vehicle must work to make more energy available therewithin, hence leading to further exhaust gas emissions from the vehicle, thereby creating potential environmental problems. In contrast, the present embodiments harness the energy with exhaust gas and enable it to be stored for future use.

Any suitable device for recovering the exhaust energy and directing it to the flywheel 12 may be provided. For example, a Tesla turbine device (not shown) may be employed to use the exhaust gas as a motive agent and recover exhaust energy therefrom.

As will be known to the skilled person, a Tesla turbine, or disc turbine, is comprised of two or more disc-shaped elements fastened onto a shaft and axially spaced from one another along the shaft by washers or other suitable means. In use, gas or fluid flow in a Tesla turbine is radial, travelling in a circular or spiral path. In the present embodiments, the flow of exhaust gas to the clutch 16 and flywheel 12 may be controlled by varying the axial separation of the discs of a Tesla turbine, in order to increase or decrease the volume of gas being transmitted therethrough and input to the clutch 16, per unit time.

In the arrangement shown in FIG. 2, there is no Tesla turbine. The exhaust gas is instead directed to the clutch 16 and flywheel 12 via a variable geometry turbo charger (VGT) (17). VGT's and other turbocharger devices are widely used to recover exhaust gas from vehicles and use it to boost pressure at the inlet of an engine. However, due to the nature of the direct drive of a turbocharger, it cannot harness or store the energy from the exhaust gas provided to it. According, as an alternative or in addition to performing its normal functionality of providing boosted air to the engine, a VGT may be advantageously employed to utilize excess exhaust gas energy via the flywheel 12 such that the energy therein may be stored for future use.

As shown in FIG. 2, the clutch 16 is provided between the flywheel 12 and a variable ratio system 22. As discussed further below, a variable ratio system may include a variator device such as a continuously variable transmission (CVT) or infinitely variable transmission (IVT) or a comparative electric machine arrangement. The variable ratio system 22 in FIG. 2 leads to the driveline of the vehicle, such that the flywheel device 12 is mechanically coupled to the internal combustion engine (ICE) of the vehicle to provide a mechanical hybrid drive system. However the flywheel 12 could alternatively or additionally be used for other purposes including direct drive, charging other battery types, and/or powering vehicle outputs other than the driveline, whilst still being arranged to be charged by the exhaust gas stream of the vehicle.

The clutch should be capable of engaging to synchronise the flywheel (12) input and the turbine element in the arrangement as shown in FIG. 2. It therefore should engage in a slipping state and therefore dissipate a small amount of energy.

A lightweight low-inertia dry-type single plate or cone type-clutch could be used as a straight-forward solution. More compact solutions include an electro-mechanical particle clutch which is used on a/c compressor and supercharger drives but typically has a fairly low speed range or a wrap spring clutch device which, being a one way device, will only provide torque to the flywheel preventing any drag losses from the turbine when the engine is not "on-boost".

When synchronised by the variable ratio system (22), the turbine will spin at flywheel speed and therefore variable inlet geometry could be used to optimise the turbine efficiency based on operating conditions including flywheel speed, exhaust mass flow rate, and exhaust manifold pressure.

And so a mechanism is provided for recovering combustion engine exhaust gas energy and storing it for future use. The flywheel 12 according to the present embodiments does not require any additional energy source such as an electric motor in order to initiate charging or top it up, but instead continual auxiliary charging of the flywheel system is provided by making use of existing exhaust gas energy which would otherwise be wasted in a conventional vehicle system. Unlike turbochargers, the flywheel performance is not limited by turbo lag. Furthermore, the energy in the flywheel 12 does not need to be used immediately but can be stored for future use in a variety of applications within a vehicle, as will be understood further from the descriptions below. Moreover, because the mechanism as illustrated in FIG. 2 uses exhaust gas flow in which there is kinetic energy and provides it for storage in a flywheel also as kinetic energy, losses due to conversion between energy types are reduced.

Flywheel-Assisted Turbocharging

According to an implementation of the above-described example, the flywheel 12 can be placed in the wastegate loop of a turbocharger. As will be familiar to the skilled person, a turbocharger is a passive device placed in the exhaust gas stream in a vehicle or engine, the purpose of which is to direct exhaust gas energy to a compressor to increase this pressure therein. However if there is too much mass flow through the turbine itself this creates a back pressure which increases the engine's exhaust manifold pressure above its optimum level, thereby making the engine less efficient. In order to avoid this, the turbo charger has a wastegate in order to release excess gas therefrom, hence helping to optimise both the engine boost pressure and the exhaust manifold pressure at different system operating points.

In conventional arrangements, the energy in the exhaust gas that is released from a turbocharger wastegate is not harnessed but instead is lost as the exhaust gas is released from the vehicle. According to the present example, this waste of exhaust gas energy is addressed. The energy within the excess exhaust gas emitted from the wastegate of the turbocharger is directed to the flywheel to provide an input thereto. Either immediately or at a later time, the flywheel 12 can then be used to assist in driving the compressor of the turbo charger. Therefore, by using the turbocharger and flywheel 12 in combination, exhaust gas energy is intelligently captured and harnessed in order to assist running of the turbocharger. This enables more efficient operation of the turbocharger, as can be understood from FIG. 3.

Figure 3:
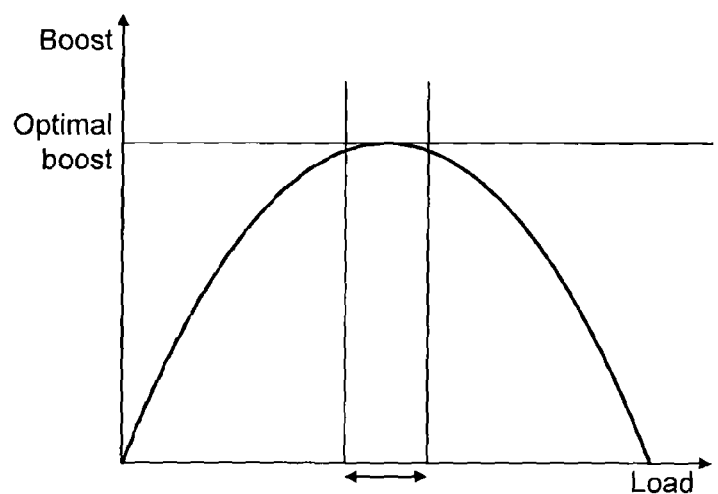
FIG. 3 shows a relationship between boost and engine load for a conventional turbocharger device.

Looking at FIG. 3, the boost-load relationship for a conventional turbocharger is illustrated. It can be seen that the turbocharger produces an optimal ideal boost for the associated internal combustion engine only for a small range of engine loads. However using a flywheel 12 to drive the compressor of a turbocharger, in combination with the turbocharger turbine, acts to optimise boost over a greater range of loads and hence flatten the curve shown in FIG. 3. Thus improved turbocharger efficiency is achieved.

Flywheel-Assisted Supercharging

As well as being operable for use with a turbocharger, a flywheel according to the above examples may be used in order to drive a supercharger device for a vehicle. As discussed briefly above, known supercharger devices operate by using engine power in order to drive the compressor of the supercharger and boost charge pressure in a vehicle. This direct use of engine power causes parasitic losses, hence compromising the potential efficiency of the vehicle in operation.

According to the present example it has been recognised that a flywheel device can be used to drive a charge boosting device such as a supercharger in order to boost engine charge pressure without directly taking power from the engine, thus avoiding parasitic losses that are typically associated with superchargers. The flywheel can be charged using exhaust gas energy, as discussed above. Alternatively, energy may be recovered from the driveline of a vehicle, for example during regenerative braking or engine load levelling, and stored in an auxiliary flywheel device for use in driving a supercharger. Energy may be recovered from the power train through any suitable mechanical linkage such as a variator, also discussed above.

In operation, a supercharger is coupled to the driveline of the vehicle. The flywheel acts as a torque supply to the supercharger, therefore enabling energy stored in the flywheel to be supplied indirectly to the driveline via the ICE.

The mechanical linkage used between the flywheel and the supercharger may include a clutch as discussed above in relation to the exhaust driven flywheel example. As an alternative, an overdrive clutch could be used, whereby turbine energy is used directly in the conventional sense to drive the compressor when it is up to speed and flywheel energy is only used when the turbine is idling (i.e. low engine speed). This requires an overrun clutch which only drives in one direction, for example a wrap spring clutch. This is particularly effective for electro-magnetic flywheel configurations in which speeds do not need to match—the flywheel is then charged from the turbine via an electrical path when the turbine is over-boosting at high engine speeds. The flywheel drives the compressor at low engine speeds also via an electrical path.

Because, according to the present example, the flywheel is charged using driveline energy and/or exhaust gas, energy that would otherwise be wasted in a conventional system is instead harnessed. By harnessing the otherwise-waste energy, the overall performance of the vehicle is improved. In particular, performance benefits are provided with respect to both fuel consumption and vehicle emissions.

The auxiliary flywheel device according to this example can be used as the sole energy source for the supercharger or can be used as an add-on to an existing supercharger energy source. For example, it can provide power boosting to a supercharger at low engine speeds, at which point it is not preferable to use direct engine power for supercharging purposes. Therefore, because the flywheel is operable to enhance power supply to a supercharger, the supercharger can provide an ideal inlet pressure and mass flow into an ICE regardless of the operating engine speed of the vehicle, and in sympathy with any mass flow being provided by a turbo system (if present) at that time. Put another way, the flywheel driven supercharger can provide optimal charge boost at any point of the engine operating map for a vehicle. This provides particular advantages for driving maneuvers such as pull away, which benefit from an immediate short-term surge of energy when engine exhaust mass flow is low and power is otherwise low, especially in a highly boosted engine.

Another advantage of the flywheel driven supercharger is that it allows for downsizing of an engine since the engine power density during low exhaust mass flow events such as pull away, described above, is improved. The reduction in size reduces friction and pumping losses, thereby improving its efficiency. It is anticipated that, by actively controlling the mass flow into the cylinder of an engine to optimum in all conditions, the flywheel driven supercharger could result in up to a 30% reduction in fuel consumption for an engine even without downsizing. Downsizing the engine will therefore enhance this potential fuel consumption advantage and also satisfy the growing consumer trend for achieving maximum performance from as small, compact and low cost an ICE as possible.

The above described advantages of the flywheel driven supercharger are particularly pronounced for diesel engines for which there is typically more gaseous mass in the chamber to be compressed and expanded than would be the case for gasoline engines. As the skilled person will appreciate, the ideal inlet pressure varies between engine and vehicle types, and can be derived, for example from the design load map for such a vehicle.

Dual-Mode Battery

Figure 4:
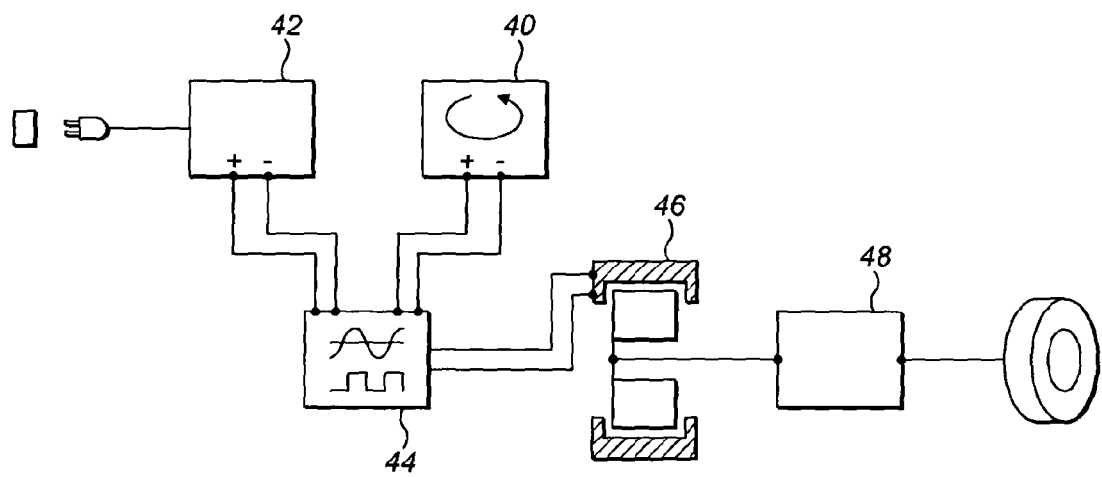
FIG. 4 shows a possible layout for dual-mode operation of a flywheel battery in parallel with a chemical battery.

FIG. 4 shows a possible layout for another flywheel use according to a further example. A configuration is shown for using mechanical flywheel energy storage in parallel with a conventional plug-in chemical battery system. The mechanical 40 battery comprising the flywheel can be used, for example, to handle regenerative braking energy recovery as an alternative to this function being performed using the chemical battery 42. As discussed above, regenerative braking and recovery during a typical vehicle usage scenario tends to require high power and frequency cycling of the battery system charge level for a hybrid vehicle or machine. Such high frequency cycling can have significant negative effects on chemical batteries, deteriorating their health and limiting the life of the overall system.

According to an embodiment, a mechanical flywheel battery 40 operates in parallel with a chemical battery 42, feeding into the power electronics 44 of an electric machine 46 which, in turn, is arranged to provide power to the hybrid driveline 48 of a vehicle.

The arrangement as shown in FIG. 4 is not limited to using the flywheel as the main battery for regenerative breaking. The flywheel battery 40 may advantageously be used as the main battery for any rapid or short-term energy supply and/or recovery during vehicle use, whereas the chemical battery 42 is more suited to lower charge rates, i.e. slower, longer-term energy supply and recovery. As will be appreciated from the additional Figures discussed below, the parallel chemical 42 and mechanical 40 batteries according to the present example should be arranged and operated according to the same considerations as any other battery arrangement. That is, one must consider the available energy, power and lifetime of the two batteries in isolation and in combination.

It should be noted that whilst FIG. 4 shows an embodiment wherein two batteries are arranged in parallel, they could also be arranged in series with the mechanical flywheel battery 40 positioned between the chemical battery 42 and the transmission of an engine.

By using a mechanical flywheel battery 40 in conjunction with a chemical battery 42, it is possible to reduce the overall costs of the battery supply for an electric machine since a smaller chemical battery will be required for use in conjunction with a mechanical battery for any given power requirement, as compared to a chemical battery being used on its own, without mechanical battery support. Alternatively, the lifetime costs of the electrical supply system could be reduced by increasing the life of an existing battery by reducing the cycling frequency and/or the peak power demanded of, or supplied to, the chemical battery.

Figure 5:
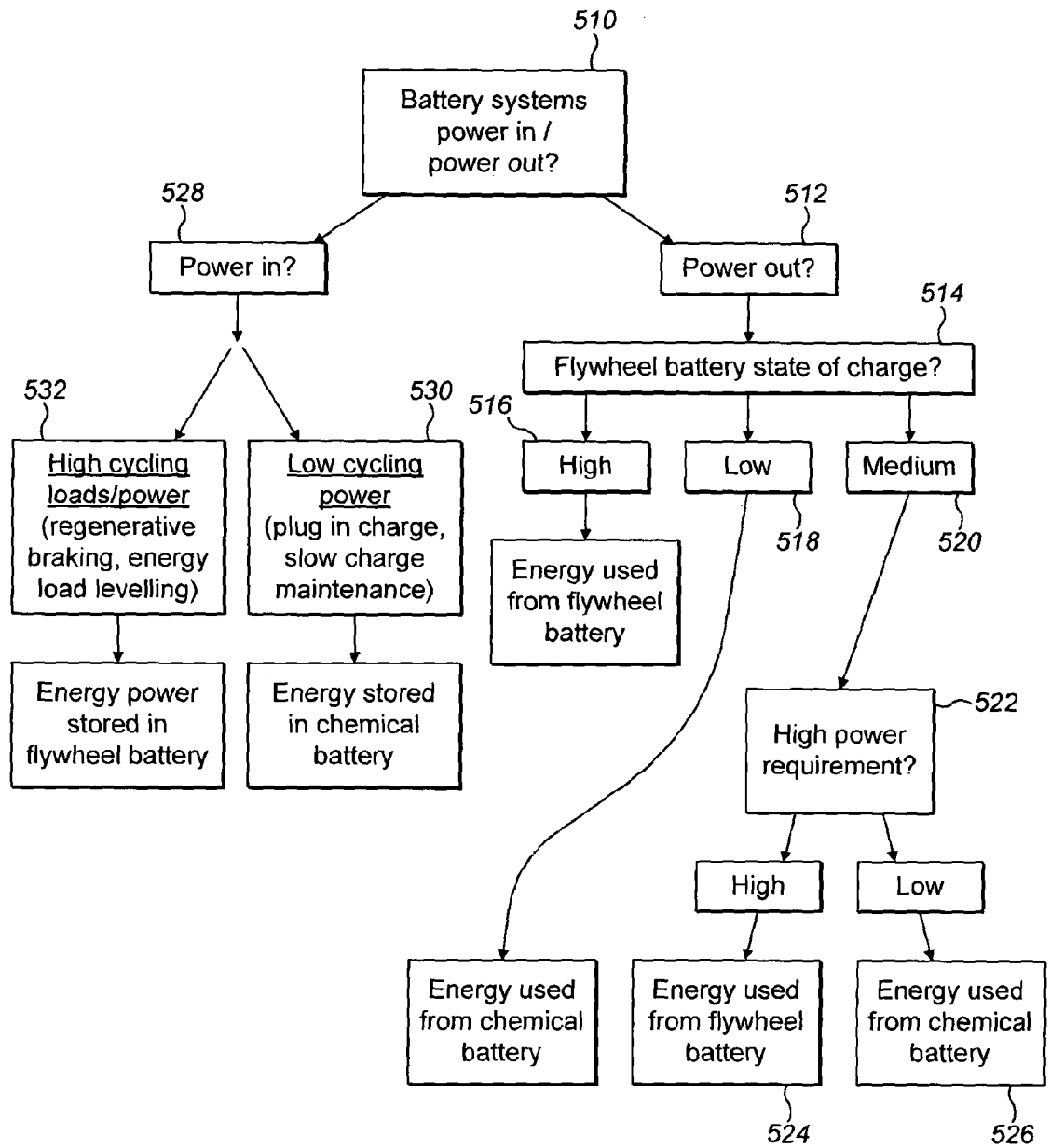
FIG. 5 shows an exemplary control flow for the arrangement of FIG. 4.

Looking at FIG. 5, an exemplary control scheme can be understood. At a first step 510 it is considered whether, at a particular moment in time, power is going into or out of a combined chemical and mechanical battery system, such as the one illustrated in FIG. 4. If, according to the vehicle user requirements and operating conditions at that time, power is to go out 512 of the battery system in order to provide power to the electric machine 46, the flywheel battery state of charge is then considered at step 514. If the flywheel battery state of charge is found to be high 516, energy will be used from the flywheel battery 40 to supply power to the electric machine 46. If, on the other hand, the flywheel battery state of charge is low 518, energy from the chemical battery 42 will instead be used. If, as often will be the case, the flywheel battery state of charge is medium at a time at which power output is required from the battery system, it will then be considered at step 522 whether the power requirement at that time is high or low. If the power requirement is high, the energy to meet that requirement will be taken from the flywheel battery 524. However if the power requirement is low, such that a significant recharging cycle would not be required thereafter, the energy to meet the power requirement will be taken from the chemical battery 526.

Going back to control step 510, if it is decided at step 528 that power is to go into the battery system, the next consideration is whether this power-in will happen at low cycling power 530, for example during plug-in charging or otherwise slow charge maintenance, or whether the power-in is to happen at high cycling loads or power, for example during regenerative braking or engine load levelling. For low cycling power-in, the energy will be stored in the chemical battery 42. However for high cycling loads or power the energy will instead be stored in the mechanical flywheel battery 40. In this manner, a control system is provided that optimises the energy storage and recovery cycling characteristics of each of the battery types whilst at the same time ensuring that each battery is sufficiently charged to deal with dynamically changing engine and vehicle requirements.

Figure 6A:
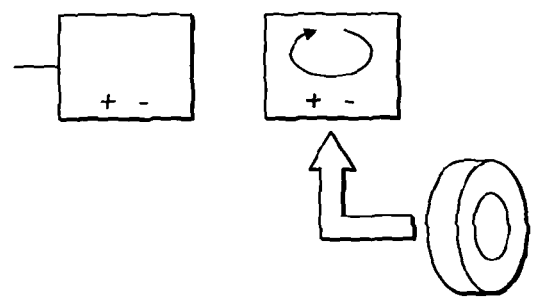
FIG. 6a shows energy flow in the arrangement of FIG. 4 during load levelling or regenerative braking.

FIGS. 6a to 6e further illustrate the above-exemplified control logic. FIG. 6a illustrates energy flow during load levelling or regenerative braking, during which times energy is recovered and reused over short time intervals. As shown in FIG. 6a, the energy that was previously present in the vehicle as kinetic energy is recovered through the driveline into the flywheel battery, in order to avoid a cycling frequency of chemical battery charge and also, advantageously, to avoid conversion between energy types which can lead to energy dissipation.

Figure 6B:
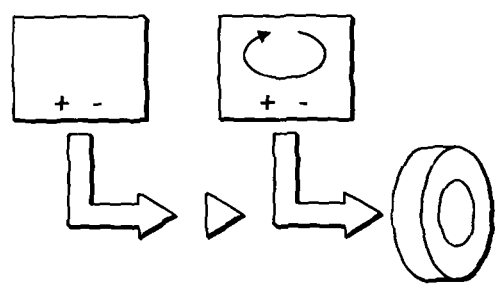
FIG. 6b shows energy flow in the arrangement of FIG. 4 during power assist from an electric machine to an ICE.

In FIG. 6b the electric machine is being used to boost power supply from an ICE in a hybrid vehicle. Both the chemical battery 42 and the flywheel battery 40 are used to supply energy to the electric machine in order to meet the vehicle's output demand at that time. Thus, it will be understood that the two battery types can be operated either together or separately, depending on the energy requirements and other control considerations at a given point in time.

Figure 6C:
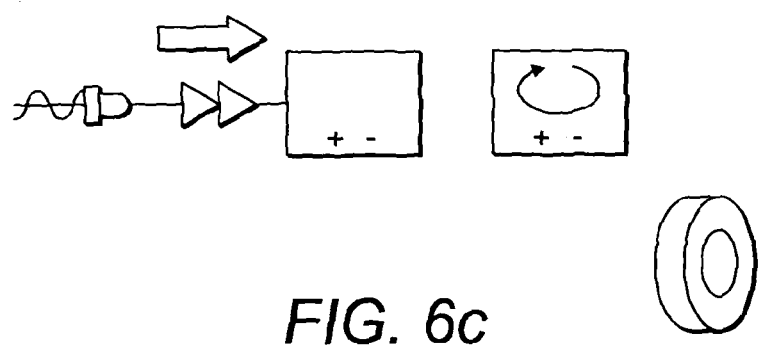
FIG. 6c shows energy flow in the arrangement of FIG. 4 during plug-in charge.

In FIG. 6c the chemical battery is being charged via plug-in means. The chemical battery stores long-term charge from plug-in mains electricity, for subsequent use.

Figure 6D:
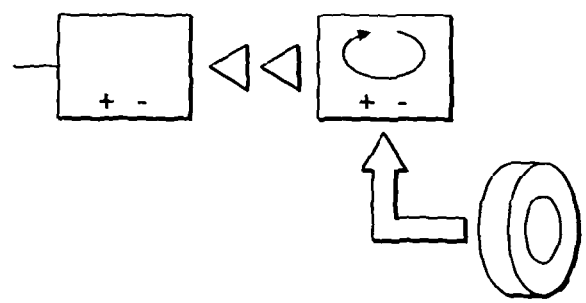
FIG. 6d shows energy flow in the arrangement of FIG. 4 during slow charge maintenance.

In FIG. 6d it can be seen that energy may be provided from the mechanical battery 40 to the chemical battery 42. FIG. 6d illustrates slow charge maintenance wherein high power energy recovery from the vehicle wheels and driveline is directed to the flywheel battery 40 and thereafter low power charge from recovered flywheel energy is supplied to the chemical battery 42 for long term storage in chemical form. In this way, the currents flowing into the chemical battery 42 are minimised which, in turn, minimises the power loss to heat in the chemical battery 42. The reduction in power loss in the chemical batteries improves the system efficiency and reduces the impact of the deleterious thermal ageing effects on the cell structure, as discussed further below.

Figure 6E:
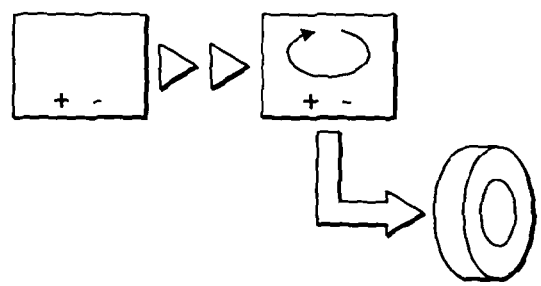
FIG. 6e shows energy flow in the arrangement of FIG. 4 during low power flywheel power maintenance and high power electric machine operation.

Finally, FIG. 6e illustrates energy flow for high power working of the electric machine 46. The chemical battery 42, which is used for long term storage of energy in chemical form, charges the flywheel 40 to enable it to provide energy to high power applications for short periods of time. As described above, the efficiency of energy supply for high power applications is greater from the flywheel battery than from the chemical battery, such that the flywheel battery is preferably used in isolation to provide energy to the electric machine when high power output is required from it.

Figure 7A:
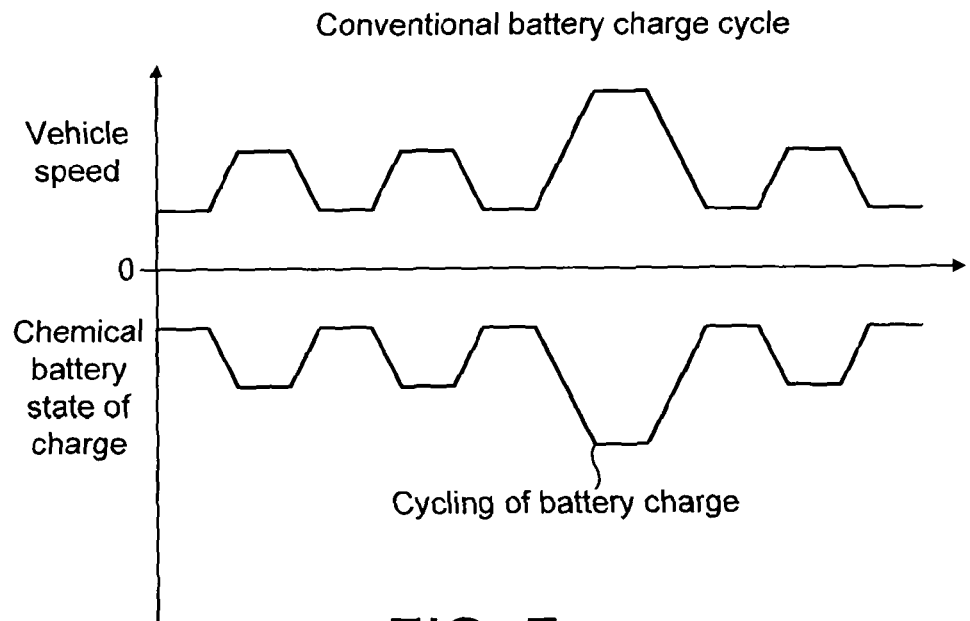
FIG. 7a shows the relationship between the vehicle speed and chemical battery state of charge for a chemical battery used in isolation in a hybrid vehicle.
Figure 7B:
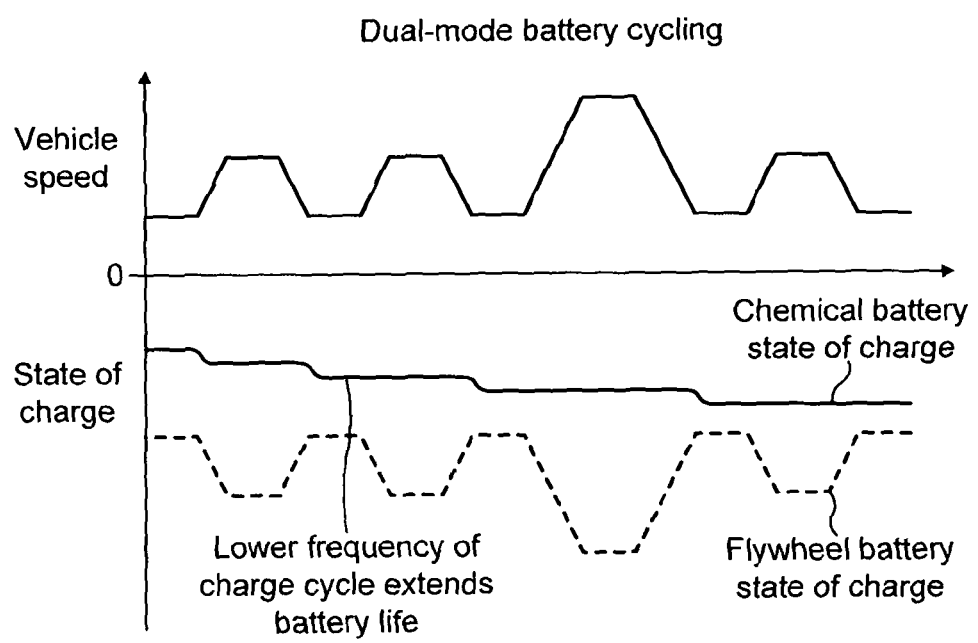
FIG. 7b shows the relationship between the vehicle speed and chemical battery state of charge in the arrangement of FIG. 4.

FIGS. 7a and 7b show a typical battery charge cycle for a chemical battery, as compared to vehicle speed, for a conventional chemical battery working in isolation and for a chemical battery working in dual mode with a flywheel battery, respectively. It can be seen from these Figures that by using energy from a flywheel battery during periods of, for example, fast acceleration or deceleration, and thereby avoiding high power flows and high cycling frequency of charge in a chemical battery, greater stability of charge in the chemical battery is achieved.

By way of further example, according to conventional vehicles using chemical batteries alone in a configuration such as that shown in FIG. 4, an energy "round trip" (wheels to battery to wheels) during regenerative braking via an electric motor/generator to a chemical battery would be expected to be between 50% and 63% efficient. In contrast, the same regenerative braking routine performed using a mechanical flywheel battery as opposed to a chemical battery as the energy storage source is expected to be up to around 84% efficient. Therefore dual-mode configurations such as that shown in FIG. 4 enable the long term benefits of a chemical battery to be maintained and at the same time introduce new and advantageous efficiency effects via use of a flywheel mechanical battery in parallel. The mechanical flywheel energy storage device is inherently suited to short term energy storage and has no fundamental limits on the power it can deliver or receive. Therefore the present example utilises the strength of the mechanical system by preferably using it for short term energy storage only. Although it is anticipated that the flywheel battery might assist the chemical battery for long term energy storage purposes in exceptional circumstances.

In a further advantage, the use of a flywheel in dual mode with a chemical battery avoids high power flows in and out of the chemical battery, thereby preventing excessive temperature elevation in the chemical battery. As the skilled person will appreciate, elevation of temperature in a chemical battery over a period of time contributes to its deterioration. Furthermore, elevating the internal temperature of the chemical battery will lead to increased system inefficiency as Ohmic losses in subcomponents rise with increased Impedance, commensurate with the elevation in battery temperature.

The overall mechanical battery/chemical battery dual-mode arrangement has an extended expected lifetime as compared to conventional chemical-only battery arrangements. Dual mode mechanical/chemical battery operation as described herein is not limited to use in conventional hybrid engines or to electric vehicles. Instead the principle may be applied more globally to other vehicle machinery and equipment, including lifts and cranes.

Because a battery apparatus comprises both a chemical battery and a mechanical battery including a flywheel, a suitable combination of those mechanical and chemical batteries may be used to supply energy to a common load. By supplying the mechanical and chemical batteries in parallel, energy does not have to be converted therebetween in order to be supplied to the load. Furthermore, a single controller can exert control on both the mechanical battery and chemical battery simultaneously, in order to manipulate and control their operation according to instantaneous operating requirements.

Because the mechanical battery and chemical battery are both rechargeable by the system including the load to which they, at other times during operation, supply energy, efficiency of the system as a whole is improved. It is ensured that no energy from the load is wasted or dissipated as is the case with many conventional systems, but instead it is harnessed and stored for future use in the mechanical battery and/or in the chemical battery. And because the mechanical battery and chemical batteries are arranged to recharge one another, energy can be supplied from or to the more suitable of the two batteries to or from the load during operation and, if that results in imbalanced or otherwise suboptimal charging of the two batteries, this can be rectified between the batteries without affecting energy supply to or from the load. Furthermore, it enables, for example, the flywheel to be run down at the end of period of operation and the energy therein to be stored long term in the chemical battery, rather than merely being dissipated.

Because the mechanical and chemical batteries can be used to supply energy to an electric motor, a useful and practical application of the present battery apparatus provided. Furthermore, the electric motor may be implemented in a hybrid electric vehicle, hence the battery apparatus is used in an efficient manner that has advantages including reduction of emissions.

By implementing a suitable control of energy flow in a system having a battery apparatus including a mechanical battery and a chemical battery, operational efficiency of the corresponding system can be optimised. The control method can take several factors into account, including instantaneous battery charge, power requirement of the system load, energy cycling speeds and minimum charge threshold for the mechanical and/or chemical batteries. Therefore an intelligent, flexible and efficient apparatus and corresponding control scheme are provided.

Flywheel Torque Fill-in System

By way of another example, one aspect of user comfort and feel which known motor vehicle applications target is the "torque-interrupt" sensation caused by a gearshift event on an automated manual transmission vehicle. Whilst this transmission type is very efficient, this feeling of torque-interrupt during gearshifts compromises shift comfort and driveability for the user. According to known approaches, electric motors can be used to fill in torque during a shift interrupt of an automated manual transmission, to improve smoothness of the drive for the user. However, additional energy supply is required within the vehicle in order to power such electric motors and, furthermore, there is inevitable energy loss during the energy conversion stage between electric and kinetic energy. Dual clutch and automatic transmissions limit the torque-interrupt during a gearshift, however these transmission types are more expensive than, and/or inherently less efficient than, the automated manual transmission due to associated losses when supplying the drive system with energy.

According to a yet further example, a flywheel according to the present embodiments may be used to "fill-in" output driveline torque on a vehicle during a "torque-interrupt" caused by a gearshift event on an automated manual transmission vehicles. As will be understood from the description below, the fill-in layout and associated control methods herein address the "torque-interrupt" sensation, which can be a problem for some users, by using flywheel energy to drive or brake transmission output during a gearshift event to at least reduce or potentially eliminate the torque-interrupt feel for the user.

Figure 8A:
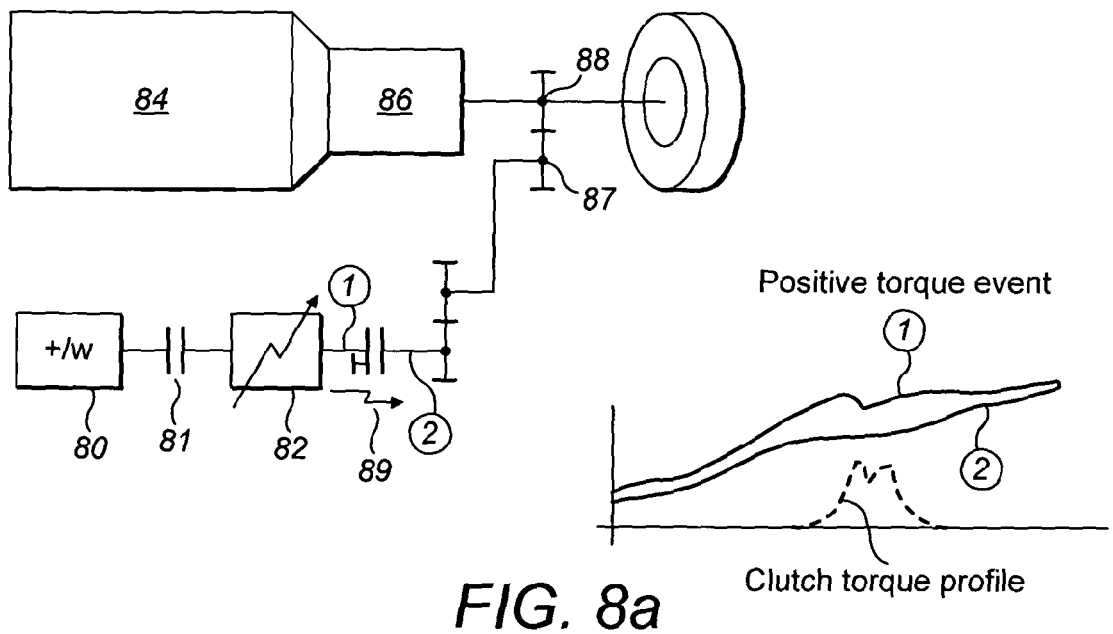

FIG. 8a shows a possible layout for using stored flywheel energy to provide torque fill-in. A flywheel motor 80 is connected to a variator 82 by a suitable isolating coupling 81. In turn, the variator 82 is mechanically coupled to the output of the internal combustion engine 84 downstream of its transmission 86, so that both the flywheel 80 and the engine 84 can provide energy to the final drive 88 of the vehicle.

The power provided by or taken in by a flywheel is proportional to the angular acceleration of the flywheel, i.e. the rate of change of flywheel speed, assuming the flywheel has a constant inertia. Therefore the rate of change of torque delivered by the flywheel 80, via the variator 82, is inversely proportional to the angular acceleration of the flywheel and thus the rate of change of ratio across the variator 82. However it is anticipated that controlling ratio across the variator 82 alone would not provide sufficient control resolution for effective flywheel torque fill-in as required according to the present example.

As will be known by the skilled reader, most variators are designed to control the speed ratio there-across and are not inherently designed for torque control. For variators in which speed only is controlled, using a variator in isolation to control torque over short durations gives rise to potential problems due to internal slippage of variator elements and, possible delays in the reaction of the variator's regulation mechanism. Therefore, in order to provide sufficient control of the torque delivered to or taken from the driveline by the flywheel 80 according to the present example, regulating coupling means 89 are provided between the variator 82 and its final mechanical coupling point 87 with the driveline 88.

This use of regulating coupling 89, including a clutch, appropriately positioned within the ratio train as illustrated in FIG. 8a, enables enhanced torque control that would not be possible by using a variator 82 alone. The configuration as shown in FIG. 8a can use variator 82 speed control to maintain a consistent but limited slip across the clutch in order to minimise slip dissipation but ensure consistent torque direction between the flywheel 80 and the final driveline 88. This enables torque control resolution in the range, for example, 0 to 100 Nm but in a compact and cost effective package. The torque control device including the variator 82 and regulating coupling 89 according to the present example provides a fast response, in the region of less than 100 milliseconds, thus enabling immediate reaction of the flywheel 80 in providing torque fill-in to the driveline 88 when required, particularly during a gearshift event. The arrangement as shown in FIG. 8a minimises energy dissipation and thus ensures that as much of the stored energy in the flywheel 80 ultimately is converted to effective torque fill-in in accordance with the vehicle's needs over time.

In operation, the clutch comprised in the regulating coupling 89 can direct and control both brake torque and accelerating torque from the flywheel 80. That is, if the flywheel side element has a speed which is below the speed of the driveline side element then brake torque will result from the clutch action. Conversely, if the flywheel side element has a speed that is above the driveline side element then accelerating torque will result from the clutch action.

It will be appreciated that the magnitude of the slip across the clutch will increase the extent to which energy is dissipated in the clutch. However, according to the present embodiments, minimal energy dissipation is suffered in the clutch device during its operation, providing slip limitation in conjunction with variator control. This allows for downsizing of the clutch unit within the regulating coupling 89 as compared to a typical launch clutch on a separate ratio transmission vehicle. The clutch used in the regulating coupling 89 according to the present embodiments may be of any suitable type including a magnetic clutch, a passively cooled dry clutch unit, a passively cooled sealed wet clutch unit with mechanical actuation device, wet clutch plates with internal passive pumping device, or a multi plate clutch.

Figure 8B:
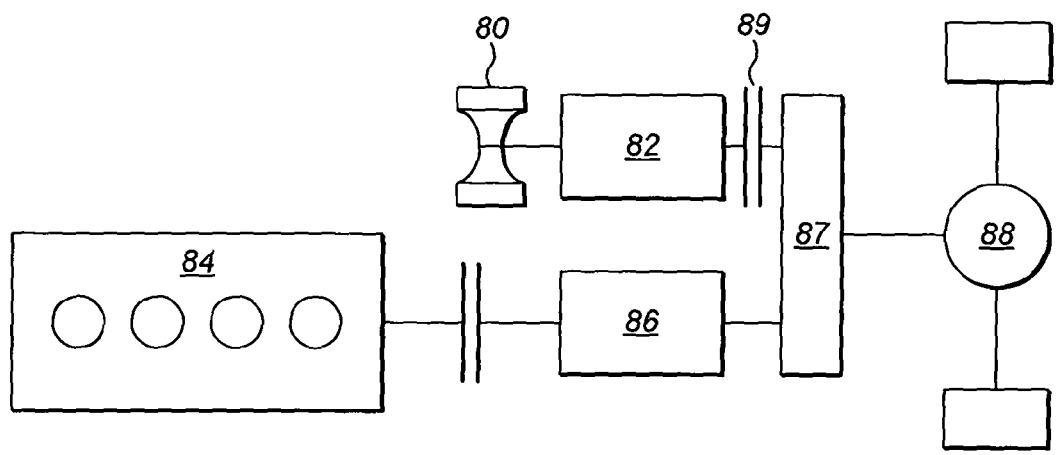
Figure 8C:
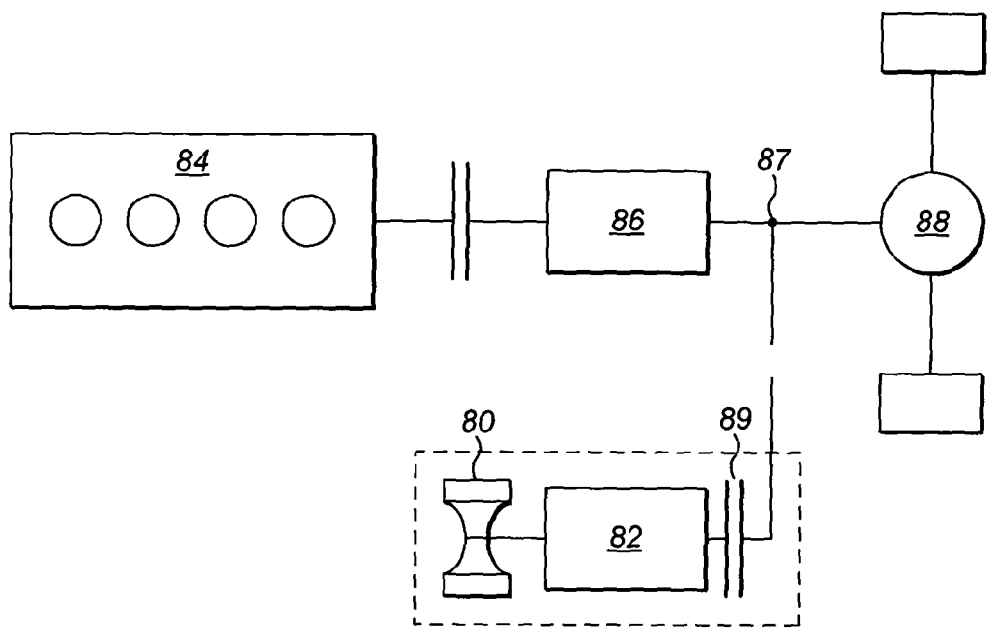

The control strategy for flywheel torque fill-in can be understood with respect to the arrangement of FIG. 8a and further with respect to FIGS. 8b and 8c, which also illustrate suitable configurations according to this example. The control logic includes consideration of whether the engine power is on or off during a given gearshift manoeuvre and also on whether the shift is an upshift or a downshift.

For a "power-on" upshift, the flywheel 80 is required to provide accelerating torque to the driveline 88. This enables the torque change at the vehicle wheels during the gearshift to be spread over the complete shift without compromising the shift time or vehicle speed. Thus advantages provided are over conventional power shifting transmissions which must implement torque change at the wheels during a first torque phase before speed can be changed, thus leading to an interrupt sensation for the user.

Figure 8D:
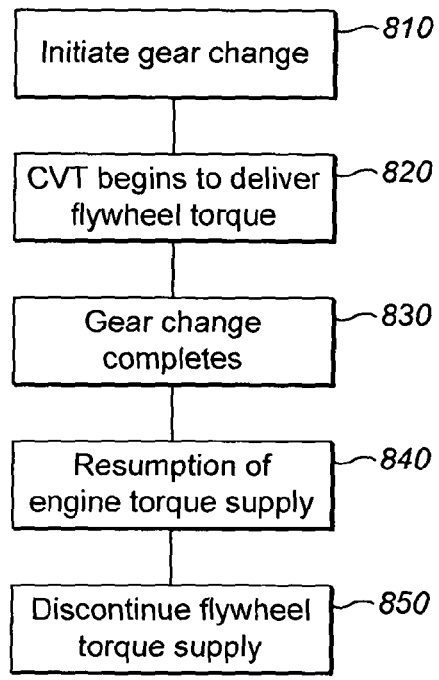

By way of illustrative example, FIG. 8d shows a possible control flow for a flywheel torque fill-in system according to the present example. The flywheel used may be of any suitable capacity. For example, the flywheel motor 80 may have a capacity of 400 KJ and the variator 82 used may be a CVT having 120 KW capability. In such an arrangement, the flywheel could supply 100 KW down the driveline, over a period of four seconds. However, as the skilled person will appreciate, a typical gearshift only take around a quarter of a second. Therefore not all the energy in the flywheel needs to be dissipated during any given gearshift and/or there can be overlap between flywheel torque supply and engine torque supply at the beginning and/or end of the gearshift.

As shown in FIG. 8d, in an exemplary control flow the user first initiates the gear change at step 810, typically using the clutch pedal or other in-vehicle clutch control means. At step 820 the CVT then comes on stream to deliver power, derived from the flywheel, to the driveline during the gear change. Once this power delivery is in place, at step 820 the gear change occurs in the engine. Once the gear change is complete, at step 840 the engine resumes responsibility for power delivery and, either at the same time or thereafter, at step 850 the power delivery from the flywheel and CVT is discontinued. At steps 840 and 850, during the transition of power delivery from the flywheel back to the engine, the engine can overrun in order to top up the charge on the flywheel in preparation for subsequent use.

The considerations and control flow are similar for a power-on downshift. wherein a conventional power shifting transmission must implement torque change at the wheels in a torque phase after speed has been changed. However, by using a flywheel 80 to contribute to braking torque during a power-on downshift, the torque change at the wheels during the shift can be spread over the complete shift without compromising shift time or speed. Furthermore, the braking energy is collected in the flywheel for later return as per the shiftup scenario discussed hereabove.

During a power-off downshift or upshift using a configuration as shown in FIGS. 8a to 8c, torque change at the vehicle wheels can be spread over the complete coast down, thus ensuring smooth coasting behaviour with no shift feel. Advantageously, because the fill-in flywheel device can recover kinetic energy, dependant on the drive mode of the vehicle, the main engine transmission can await positive torque before proceeding with further operations.

Thus the flywheel configuration and control method according to the present example provide a way of controlling torque delivered during a gearshift event in order to provide improved shift comfort for the user over the gearshift period. The flywheel fill-in system provides an efficient means of energy storage and recovery since energy between the flywheel and the driveline remains in the kinetic form, hence preventing energy dissipation that is often associated with energy conversion stages in vehicles and machinery.

Because, according to the present example, it is not necessary to convert between energy types, efficiency is increased. Therefore more energy is available in the overall system such that potentially no additional energy sources are required for torque fill-in to be provided. Because the flywheel is arranged both to provide energy to the driveline when required and to recover energy from the driveline at other points during a vehicle usage cycle, it makes use of energy that is already present in a vehicle and thus does not require an energy source in order to provide its torque fill-in function. This provides a significant advantage over, for example, electric motor fill-in systems that require an additional energy source, or at least, an energy conversion stage, in order to provide torque to the driveline.

It is anticipated that an electrically-controlled automated manual transmission having a sufficiently-sized auxiliary flywheel device will realise both torque fill-in and the additional energy efficiency benefits associated with hybrid arrangements as discussed herein. This will enable around a 20% fuel consumption reduction as compared to using a dual clutch transmission for a similar vehicle and engine operating conditions. Furthermore, using an automated manual transmission in combination with flywheel torque fill-in is no more expensive than using a dual clutch transmission.

A flywheel and associated variator and coupling, if required, can be retrofitted to an existing automated manual transmission, thereby improving its efficiency and providing improved user comfort during gearshift events in a straightforward and relatively low cost manner. The package impact of retrofitting a flywheel as described herein for torque fill-in purposes in existing systems is very low since no major redesign of the system is required for doing so. Therefore the present example has potential for use in existing vehicles as well as in future vehicle designs.

Electrical Charging/Discharging

Figure 11:
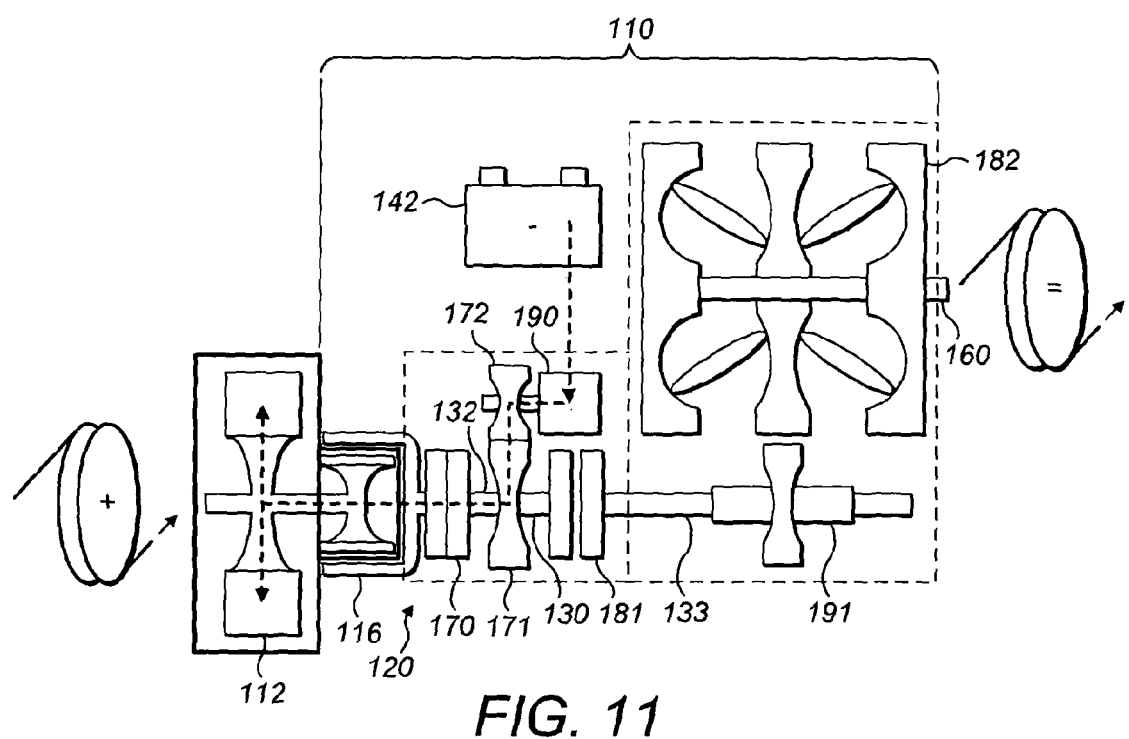
FIG. 11 shows a flywheel energy storage system.

FIG. 11 shows a flywheel arrangement which could be used in the example discussed with reference to FIG. 8c. In an embodiment, flywheel storage system 110 in FIG. 11 could be substituted for element 82 in FIG. 8c.

FIG. 11 shows a flywheel 112 which is rotationally coupled, via coupling device 116, to electrical power take-off module 120, which in turn is rotationally coupled to a variable ratio transmission device 182. The flywheel 112 can be of the type shown in FIG. 1 and preferably operates in a vacuum. The coupling device 116 can be, for example, a direct mechanical or magnetic coupling. The variable ratio transmission device 182 (alternatively referred to as a "variator") can be a continuously variable transmission (CVT), or an infinitely variable transmission (IVT). A CVT is able to vary its transmission ratio over a range, for example from 0.3:1 to 2.6:1. An IVT is able to vary its transmission ratio over a range which includes the condition where the output shaft remains at rest for a non-zero input rotation speed. In such a condition, since the input shaft can rotate freely while the output shaft remains at rest, the gear ratio is in effect ∞:1 and this condition is termed "geared neutral". In the arrangement shown in FIG. 11 a twin cavity, full-toroidal CVT is used. Such a transmission has a layshaft 191 and a mainshaft 160 which are geared together. Of course, other types of variable ratio transmission, such as for example half-toroidal type, ball or roller traction type, belt type, hydrostatic and hydrodynamic type variable-ratio transmissions are possible.

The mainshaft 160 of the transmission 182 connects to the rest of a vehicle in which the flywheel storage system 110 and flywheel 112 may be employed. For example, the mainshaft 160 can be connected to a vehicle transmission via a flywheel control clutch 89 as shown in FIG. 8c. Thus, the flywheel is connected to the vehicle transmission by mechanical coupling means.

The variable ratio transmission device 182 provides a means of transferring power between a flywheel system and any other rotating system, for example a passenger car's differential gear. The transmission 182 is able to continuously vary its transmission ratio to match flywheel speed to the system speed. The transmission is arranged such that its gearing ratio can be varied sufficiently to match the range of flywheel speeds encountered when in use to the range of vehicle transmission speeds encountered in use. When a CVT is used, the flywheel control clutch 89 allows the flywheel storage system 110 components to continue rotating with the flywheel 112 while the vehicle and its transmission are at rest. When an IVT is used, the infinite input speed to output speed ratio it provides allows the above functionality without the need for the flywheel control clutch 89, since when the ratio is selected to be ∞:1 (the "geared-neutral" condition) the flywheel can continue rotate while the vehicle transmission is at rest, thus no flywheel control clutch 89 is needed. In use, the variable ratio transmission 182 controls the power transfer in the system by driving the ratio to either accelerate (receive power into) the flywheel inertia, or decelerate (deliver power from) the flywheel inertia. The electrical power take-off module (ePTO) provides additional functionality around the above basis operation.

The electrical power take-off module 120 contains, in this embodiment, a first disconnect-type device (or "clutch") 170, and a second clutch 181, arranged on either end of a rotatable mechanical coupling member 130 which in this embodiment is split into three sections. A first section 131 of the coupling member 130 is arranged between the coupling device 116 and the first clutch 170, a second section 132 of the coupling member 130 is arranged between the first clutch 170 and the second clutch 181, and a third section 133 of the coupling member 130 is arranged between the second clutch 181 and the transmission 182. The third section 133 is coupled to the transmission layshaft 191. Each clutch 170,181 is arranged, in use, to rotationally couple together the respective section 131,132,133 of the coupling member 130 on either side of the respective clutch 170,181. Thus, in use, with both clutches engaged, the flywheel 112 rotates together with all three sections 131,132,133 of the coupling member 130 and the transmission 182 (including the layshaft 191 and mainshaft 160, provided that the transmission is not an IVT type operating in the "geared neutral" condition, otherwise the mainshaft 160 would be effectively disconnected from the layshaft 191 and could be at rest). Of course, not all gearboxes are physically configured with a layshaft and a mainshaft, however the word "layshaft" can conceptually be taken to mean input shaft and the word "mainshaft" can be taken to mean output shaft, wherein a gearbox generally provides means for providing a gear ratio between the input shaft and the output shaft.

The second coupling member section 132 carries a primary (first) gear 171 which is in constant mesh with a secondary (second) gear 172, which in turn is mounted on the rotatable shaft of an electrical machine 190. Thus, the electrical machine 190 is rotationally coupled to the flywheel drive via the coupling member 130 sections 131,132, 133 and the first and second clutches 170, 181. Electrical storage means such as a battery (e.g. a chemical battery) 142 is electrically connected to the electrical machine 190. The battery 142 is a means for storing electrical energy generated by the electrical machine 190, and can supply or receive electrical energy to/from the electrical machine 190 when in use.

The first clutch 170 provides a safety disconnect function in the event of failure of the control or transmission, so as to enable the flywheel to be disconnected from the rest of the system if flywheel speed cannot be safely controlled to be within the flywheel's safe operating limits. The first clutch 170 is arranged to fail safe, i.e. in the open position. Each clutch is arranged to have minimal losses when open or closed, i.e. when the clutch is open (disengaged) it is arranged to have minimal drag, and when the clutch is closed (engaged) it arranged to have substantially no slip and also minimal drag. Operation of the system and its associated control (which control is preferably by electronic means) should consume minimal power.

Various advantageous operations in use, made possible by the above-described configuration, will now be described.

In order to reduce frictional losses when the flywheel is merely required to store rotational energy which it already contains, the first clutch 170 can be disengaged, so as to disconnect the flywheel from the rest of the system. Thus, losses are reduced because the flywheel 112 is not required to drive the coupling member 130, primary and secondary gears 171,172, electrical machine 190 and transmission 182. The flywheel 112 preferably rotates in a vacuum, on low-friction bearings, therefore losses in the flywheel alone are reduced to a minimum.

Flywheel Pre-Charge from Battery (Start-Up)

Figure 12A:
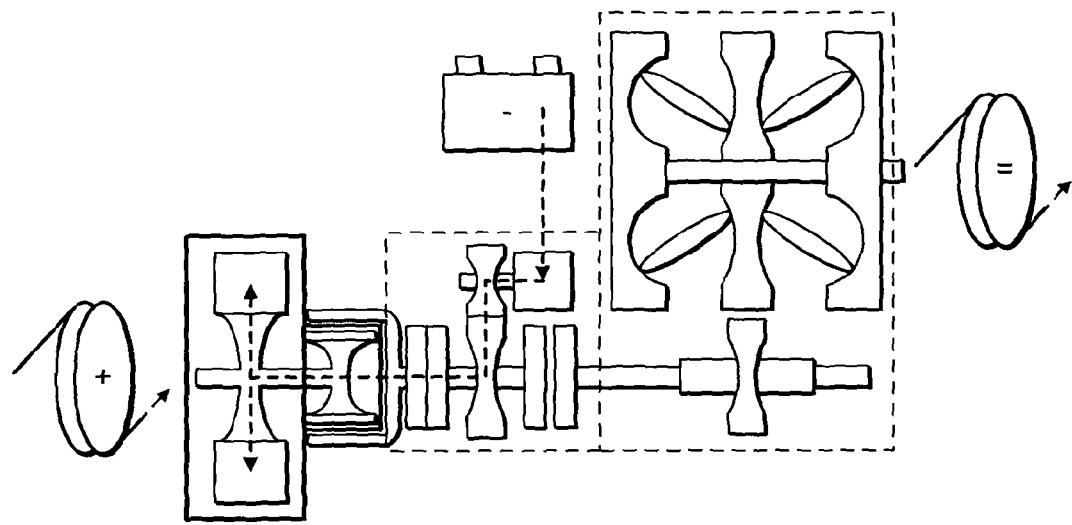
FIG. 12a shows energy flow in a flywheel energy storage system during flywheel pre-charging from battery.

As shown in FIG. 12a, the system can be configured by engaging the first clutch 170 and disengaging the second clutch 181, so as to mechanically couple the flywheel 112 to the electrical machine 190 but not to the transmission 182. When thus configured, it is possible to supply energy from the battery 142 to the electrical machine 190 operating as a motor, thereby rotating the machine and the coupling member 130. Thus it is enabled to rotate the flywheel 112 with the electrical machine 190, so as to pre-charge the flywheel upon start-up, or to re-charge the flywheel between acceleration events. By disengaging the second clutch 181 during flywheel charging, frictional losses are reduced because the electrical machine does not need to rotate the transmission 182 and thereby incur associated frictional losses.

Flywheel Discharge to Battery (Shut-Down)

Figure 12B:
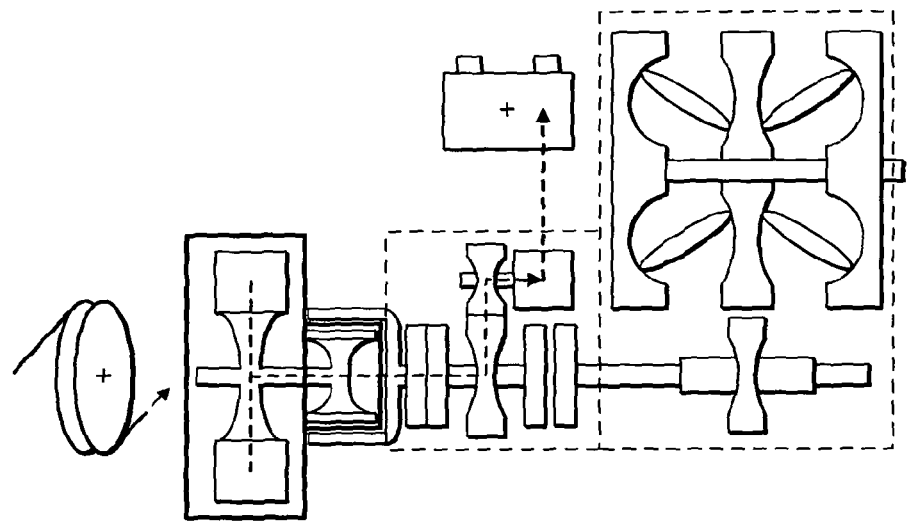
FIG. 12b shows energy flow in a flywheel energy storage system during flywheel discharge to battery.

As shown in FIG. 12b, when configured as in the preceding paragraph, it is also possible to transfer electrical energy from the electrical machine 190 to the battery 142, the machine acting as a generator and driven by the flywheel 112. In this way, stored flywheel energy can be transferred to the battery for longer term storage after switch-off of the system 110. This is useful because the flywheel 112 does not provide for long-term storage, because its stored energy will gradually dissipate as heat due to frictional losses. The battery 142 is more suited for long term energy storage because its stored energy does not dissipate as quickly as in the case of the flywheel 112. Although losses result from the conversion of energy from mechanical flywheel energy to electrical battery energy, the losses are more than compensated for by the recovery of flywheel energy which would otherwise be lost each time the vehicle was stopped and parked for an extended period of time.

Auxiliary Power

Additionally, when configured with either or both clutches 170,181 engaged, electrical power can be taken from the flywheel 112 and/or from the transmission 182, via the electrical machine, 190 which can be used to power an auxiliary electrical load in a vehicle, for example a CD player or satellite navigation system, or other vehicle auxiliary components such as an electric supercharger, electric power steering or electrically driven air conditioning. Depending on the clutch(es) engaged, the power used to drive the electrical machine can be supplied by the flywheel 112 or by the transmission 182, or by a combination of both. An advantage of driving such auxiliary electrical components from the electrical machine output, rather than from the output of a conventional engine-driven alternator, is that the vehicle's internal combustion engine is not required to provide the energy to drive the auxiliary electrical components, instead the energy is provided at least partially from regenerative braking energy, thereby improving fuel efficiency. Also, by using the regenerative energy to directly power auxiliary electrical components, rather than first storing the energy in a battery and then subsequently providing battery power to the electrical components, the charge-discharge cycle is avoided, thereby extending battery life and avoiding energy conversion losses between chemical and electrical energy, thereby further improving energy efficiency.

Additionally, when both clutches are engaged, the transmission can supply power to the flywheel and to the battery/auxiliary electrical load.

Alternatively, when both clutches are engaged, the flywheel can supply power to the transmission and to the battery/auxiliary electrical load. Also, as shown in FIG. 12d, stored battery energy can be used to rotate the electrical machine 190 and thereby supply power to the flywheel 112 and simultaneously to the transmission 182. Many combinations of energy flow are possible, as will be apparent to the skilled person in the light of the above description and FIG. 11.

With both clutches 171,180 engaged, energy can be transferred mechanically between the flywheel 112 and the transmission 182 via the coupling member 130. The flywheel 112 is a rotating inertia which provides a mechanism for storing mechanical energy. The inertia's rotational velocity increases when receiving energy from the rest of the system, and is reduced when delivering energy to the system. The variable ratio transmission 182 has its transmission ratio adjusted during operation so as to maintain the correct ratio for adding to, maintaining or extracting energy from the flywheel 112. In this embodiment, the mechanical connection (the flywheel coupling device 116, coupling member 130, and clutches 170,181) between the flywheel 112 and the transmission 182 is the primary energy transfer path to and from the flywheel 112, meaning that the majority of the flywheel's rated power source/sink capability is provided by the mechanical connection. Alternatively, however, the electrical machine 190 could be driven by the flywheel 112 to generate electrical energy and that electrical energy could be used to drive separate motors to provide vehicle propulsion, either instead of or in combination with the mechanical connection. Alternatively, the flywheel 112 and electrical machine 190 can supply energy to the transmission 182 simultaneously together.

Flywheel Charge Maintenance (Running)

Figure 12C:
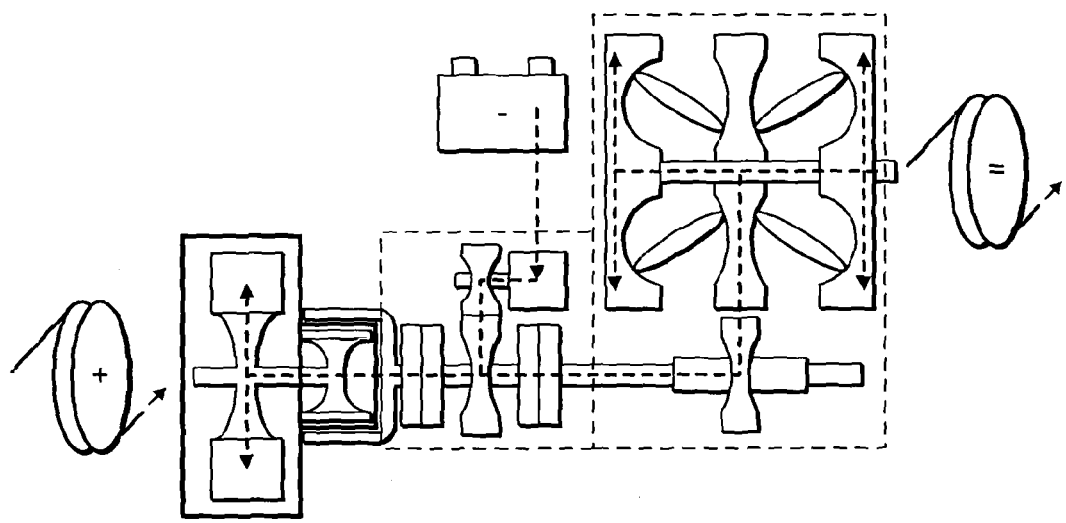
FIG. 12c shows energy flow in a flywheel energy storage system during flywheel charge maintenance, while the system is running.
Figure 12D:
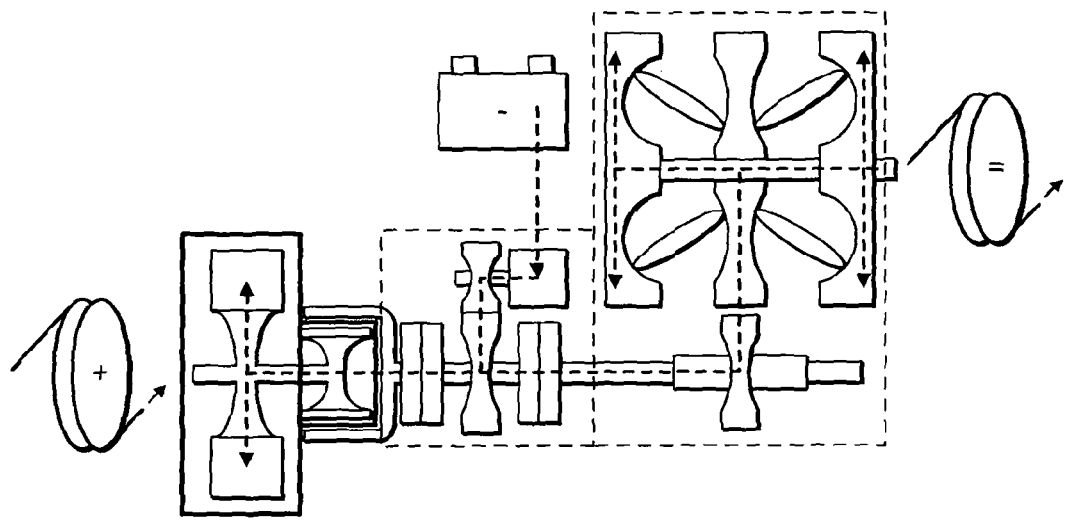
FIG. 12d shows energy flow in a flywheel energy storage system during flywheel charging from mechanical momentum and optionally from battery.

As shown in FIG. 12c, with both clutches 170,181 engaged, regenerative braking energy from the transmission 182 can be transferred to the flywheel 112. Thus, energy is stored, not wasted as heat in conventional brakes, when the vehicle slows down. If the need for a large quantity of stored flywheel energy is anticipated and the available regenerative braking energy is insufficient to charge the flywheel, then the flywheel charge can be supplemented/maintained with energy from the battery via conversion by the electrical machine. This can aid flywheel-assisted acceleration in cases where little regenerative braking energy is available, for example when the vehicle is travelling uphill. This could improve the consistency of operation of the device over a pure mechanical system which may behave differently when the state of charge is purely dependent on harvested energy levels.

Flywheel Charge Limiting (Running)

Figure 12E:
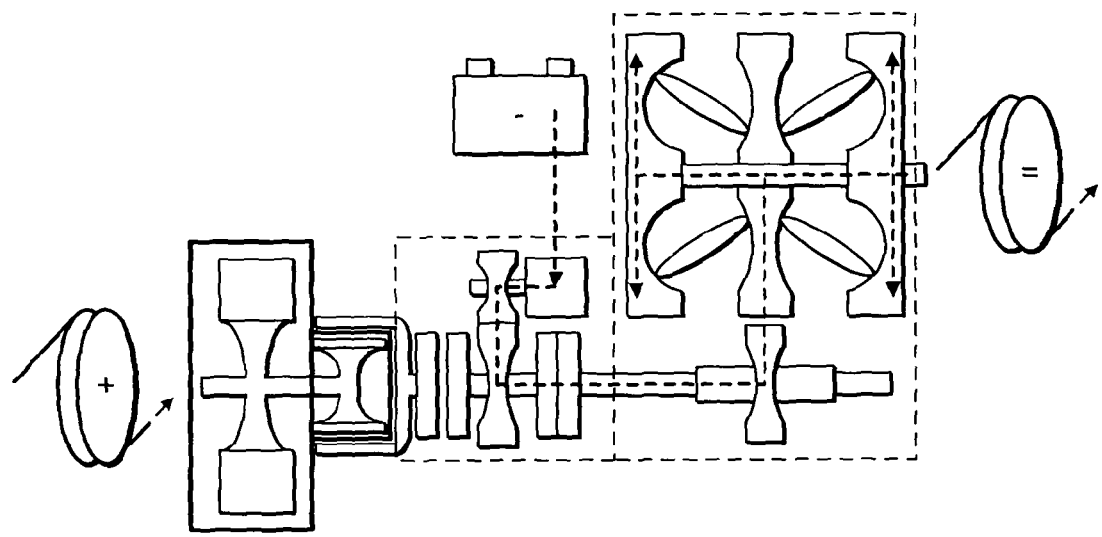
FIG. 12e shows energy flow in a flywheel energy storage system during flywheel speed synchronisation prior to clutch engagement.
Figure 12F:
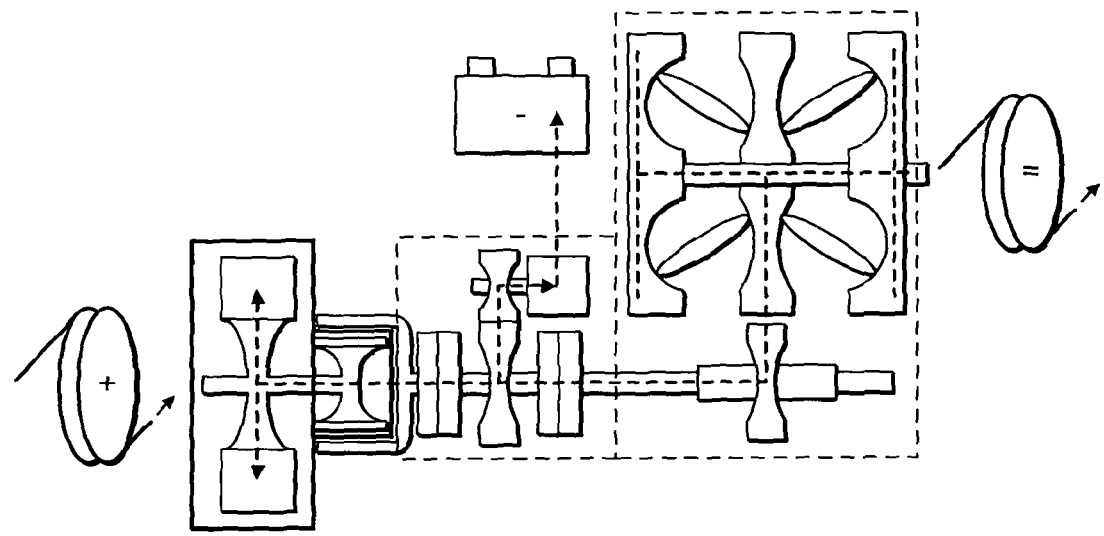
FIG. 12f shows energy flow in a flywheel energy storage system during flywheel charge limiting/battery charging, while the system is running.

Furthermore, as shown in FIG. 12f, in cases where there is an excess of regenerative energy coming from the transmission (for example when the flywheel is already rotating at or near maximum speed, perhaps after the vehicle has been travelling down a sustained incline), the excess energy can be converted to electrical energy by the electrical machine 190 and stored in the battery 142. Without this facility, when the flywheel was full or nearly full of energy, the conventional brakes would have to be applied, thereby wasting potentially recoverable energy as heat dissipated in the brakes. Instead, according to the present embodiment, the torque load produced by the electrical machine 190 at least partially balances the regenerative torque provided by the transmission 182, thereby avoiding or reducing further acceleration of the coupling member 130 and flywheel 112. By way of example, in operation so as to avoid energy being added to the flywheel, provided that the instant regenerative power is within the limits of the capability of the electrical machine to convert that power to electrical energy, and within the limits of the battery to absorb that electrical energy, the transmission 182 ratio is adjusted according to the vehicle speed so that the coupling member 130 continues to rotate at the current flywheel speed, thereby avoiding net energy exchange with the flywheel 112. Instead, the regenerative energy flows in the form of electrical energy from the electrical machine 190 to the chemical battery 142. The first clutch 170 can optionally be opened in such a situation so as to safeguard the flywheel from being subjected to excess energy input. Of course, when the flywheel is not full of energy (i.e. not rotating as maximum speed) and the battery is not full of electrical energy, the proportion of energy flowing to each of the flywheel 112 and chemical battery 142 can be adjusted/balanced such that neither exceeds its maximum desirable charge rate or charge level. In practice, it is envisaged that some embodiments will comprise an electrical machine sized such that the electrical machine can absorb or deliver only a fraction (for example 10%) of the power which the flywheel is capable of mechanically absorbing or delivering. The electrical machine would thus not be capable on its own of balancing the full torque load at the gearbox layshaft, and the remaining torque would act upon the flywheel inertia. Thus, the flywheel would be the primary energy source/sink for motive/regenerative braking energy, and the electrical machine and battery combination would be an auxiliary energy source/sink.

Synchronisation

As shown in FIG. 12e, when one of the clutches 170,181 is disengaged, for example the first clutch 170, and the system controller decides to re-engage the clutch, if a frictional-type clutch is used then the clutch can simply be re-engaged. With a frictional-type clutch, if a speed differential exists between the current rotational speeds of the two halves of the clutch (e.g. between the flywheel 112 and the coupling member 130), the frictional-type clutch will allow slip between the two halves of the clutch 170 until the friction causes the two halves of the clutch 170 to synchronise. After synchronisation, the friction between the two halves of the clutch 170 will keep the two halves rotating in synchronisation with each other, thereby transmitting drive through the clutch.

For a dog-type or toothed-type engagement clutch, however, engagement of the clutch while the two halves of the clutch are unsynchronised can result in serious wear and/or damage, not to mention undesirable operating noise and harshness, and at the very least reduced component lifetime. It is therefore desirable to synchronise the two halves of the clutch before engagement so as to avoid such wear and/or damage. Even with a frictional-type (including a slipping type) clutch, synchronisation before engagement will help to reduce wear and extend clutch lifetime. With slipping type clutches thermal issues caused by the friction are avoided by either introducing a cooling medium (for example oil) or by adding thermal inertia (mass) to prevent the friction faces from overheating and becoming damaged or wearing excessively. However, cooling mediums result in drag losses when the clutch is either open or closed. Further, large thermal inertia clutches are heavy and can become very large and therefore both such devices are undesirable in this application. Dog-type or toothed type clutches do not suffer from the problems at least to such an extent.

The arrangement of FIG. 11 allows for synchronisation of the clutches 170,181 before engagement. Not shown are speed sensors on each rotating component which it is desired to synchronise, for example, on the flywheel 112, the second section of the coupling member 132, and on the transmission layshaft 191. A system controller can monitor the component speeds on either side of the clutch to be engaged and operate the electrical machine 190 so as to accelerate or decelerate the second section of the coupling member 132 and thereby bring the two halves of the clutch 170,181 to be engaged into synchronisation with each other. For example, to synchronise the first clutch 170, the electrical machine can be operated to accelerate or decelerate the second section of the coupling member 132 to the same speed as the flywheel 112. By way of further example, to synchronise the second clutch 181, the electrical machine can be operated to synchronise the second section of the coupling member 132 with the transmission layshaft 191, or the transmission 182 ratio can be adjusted according to vehicle speed and the speed of the second section of the coupling member 132 so as to synchronise the two halves of the second clutch 181. A further option, if the second clutch is already engaged, in order to synchronise the two halves of the first clutch 170 is to adjust the transmission 182 ratio according to vehicle speed and the speed of the flywheel 112 so as to synchronise the two halves of the first clutch 170. Thus, the system enables the synchronisation of the clutches 170,181 before engagement, and thereby allows for the use of dog-type or toothed-type clutches which are simpler, more compact, lower weight, have lower drag and are cheaper. The system also thereby allows for enhanced operating lifetime of dog-type and other types of clutches, such as frictional clutches.

The electrical machine 190 can also be operated so as to synchronise the rotating components of the flywheel energy storage system 110, including the transmission 182, with the rest of the vehicle's transmission, before engagement of the flywheel control clutch 89 shown in FIG. 8c.

Magnetic Gear for Clutching

As mentioned above, the coupling device 116 between the flywheel 112 and the ePTO module 120 can be of any suitable type including a magnetic coupling. In addition or alternatively, either the first clutch 170 and/or the second clutch 181 within the ePTO module 120 can comprise a magnetic gear. Any suitable magnetic gear may be used for the first 170 and/or second 181 clutch. For example the magnetic gear may be of the form described in co-pending patent application number PCT/EP2011/070410, in the name of Ricardo UK Limited, the entirety of which is incorporated by reference herein. Other types of magnetic gear, as will be know to the skilled person, may instead or additionally be used for the first 170 and/or second 181 clutch.

Figure 14A:
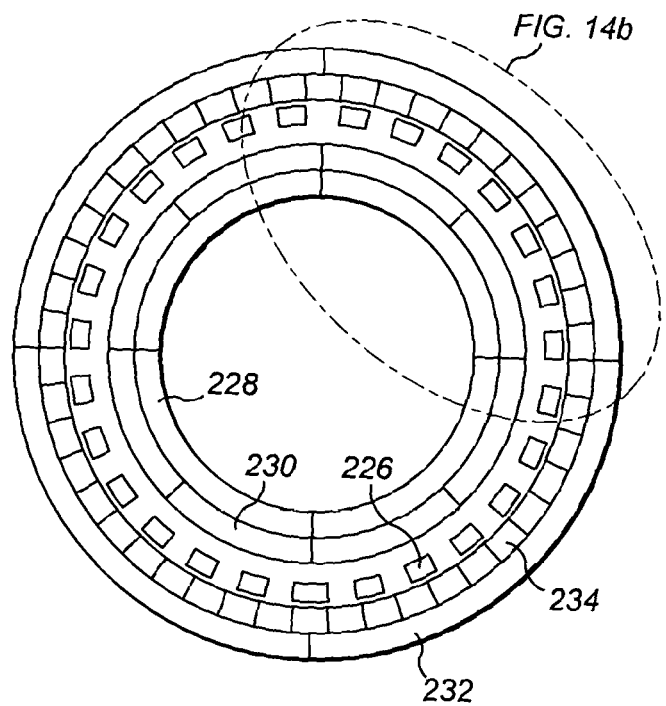
FIG. 14a is a cross-sectional view through an improved magnetic coupling that may be used within an ePTO module.
Figure 14B:
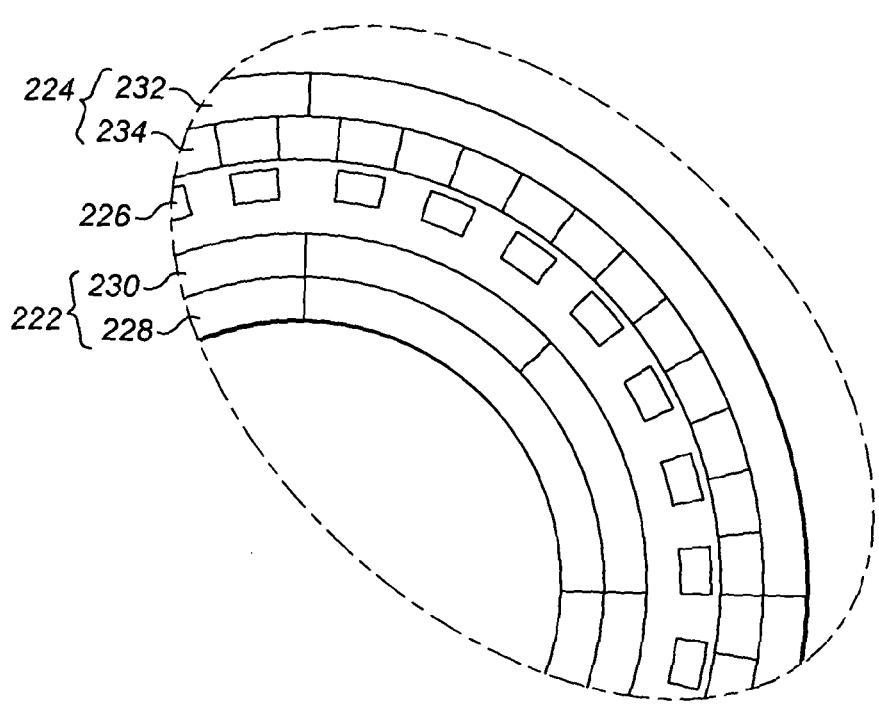

FIGS. 14a and 14b show an improved magnetic coupling which is suitable for enabling the transfer of energy to and from a rotating flywheel which is housed in a low pressure housing or vacuum. Such a coupling could be comprised with the first 170 and/or second 181 clutch shown in FIG. 11 herein, The improved magnetic coupling can comprise conventional features and/or any of the alternative or additional features described herebelow. The improved magnetic coupling is described as operating with its high speed side rotating with a flywheel in a vacuum however it is possible for either side of the coupling to operate at a range of air pressures or in a vacuum. Furthermore, it is possible to provide the coupling with its low speed side nearest the flywheel, preferably in a vacuum, and its high speed side distal to the flywheel—for example on the airside, proximal to the ePTO module 120 in FIG. 11.

The improved magnetic coupling 220 shown in FIGS. 14a and 14b comprises a high speed rotational section 222 to be housed in a low pressure area or vacuum and further comprises a low speed rotational section 224 to be housed outside the low pressure/vacuum area. The magnetic coupling 220 transfers torque through a chamber wall (not shown) situated between the high and low speed rotational sections 222, 224. The chamber wall can be stationary, Because a magnetic coupling 220 can transfer torque between the high and low speed rotational sections without any direct physical contact therebetween, the chamber wall which houses the flywheel and the high rotational speed section 224 of the coupling 220 can have a single continuous surface. There is no need for any gaps or breaks therein, nor is there any need for an additional physical coupling such as a rotating seal. This is advantageous as rotating seals often leak and therefore result in a need for an additional, energy consuming system for maintaining low pressure within the chamber housing the flywheel. For example certain existing flywheel couplings require a pump in the low pressure or vacuum chamber, wherein that pump takes energy from the flywheel and/or requires its own power source. Because such a pump is not required according to the arrangement shown in FIGS. 14a and 14b, the overall power requirement is lower and thus the system is more effective. Also, operating the high speed rotational section 222 (and flywheel to which it couples) in a low pressure area reduces energy losses due to winding.

There are a number of pole pieces 226 built into the chamber wall (not shown) in FIGS. 14a and 14b to enable and enhance the torque transfer across the boundary which is created by the chamber wall. The magnetic coupling 220 shown in FIGS. 14a and 14b has a fixed gear ratio based on the respective number of magnets situated in the high 22 and low 24 speed rotational sections and on the number of poles 26 in the chamber wall. According to one embodiment, the magnetic coupling has a gear ratio of 1 to 5.75, although any desired gear ratio may be achieved using the magnetic coupling shown in FIGS. 14a and 14b, within the physical restraints of the overall system in practice.

Both the high speed rotational section 222 and the low speed rotational section 224 include an array of permanent magnets. In detail, the high speed rotational section 222 comprises a high speed hub 28 and a high speed magnet array 230. The low speed rotational section 224 comprises a low speed hub 232 and a low speed magnetic array 234. The magnets of each magnetic array can be situated directly on the respective hub or may be separated therefrom by an air gap or by another component such as a liner. As mentioned above, the magnetic arrays are separated from one another by stationary ferromagnetic pole pieces 226 situated in the boundary between the two sections 222, 224. Although not shown in FIGS. 14a and 14b, a backing liner between the low speed hub and the low speed magnetic array 234 and/or an outer sleeve provided radially outward of the high speed magnetic array 230 should ideally also be provided in the magnetic coupling 220.

In order to further improve operation of the magnetic coupling 220, particular combinations of magnets may be used. According to an embodiment, the high speed magnetic array 230 in the high speed rotational section 222 comprises one or more magnets which are larger than one or more of the magnets in the low speed magnet array 234 on the low speed rotational section 224 of the magnetic coupling. By using larger magnets in the high speed magnet array 230 as compared to the low speed magnet array 234, the desired gear ratio from the high speed to the low speed side of the magnetic coupling can be more easily achieved. A further benefit of such an arrangement is that the larger magnets on the high speed side will be dominant over the smaller magnets on the low speed side of the coupling 220, and therefore there will be a relatively small variation in the magnetic field of the magnets on the high speed side 222.

Reducing variation in magnetic field on the high speed side will result in small losses there in comparison to the losses and heat generation occurring in the smaller magnets on the low speed side 224 of the coupling 220.

By diverting heat generation away from the components inside the high speed, low pressure chamber, and instead directing heat generation to the air side of the magnetic coupling 220, the need for cooling the low pressure or vacuum chamber within which the flywheel operates is removed or at least reduced. By simplifying the cooling requirements in this manner, the overall design of the flywheel and coupling 220 is simplified and therefore made more efficient, cost effective and user friendly.

Instead of or as well as using relatively large magnets on the high speed side 222 of the magnetic coupling 220, particular magnet types can be selected for each side of the coupling. According to an embodiment, high strength sintered magnets are used in the high speed rotational section 222 and low strength bonded magnets are used in the low speed rotational section 224.

It is known that bonded magnets have several advantages in magnetic coupling arrangements. For example they enable the magnetic gear in which they are comprised to move faster and they also reduce eddy current losses. However they are lower strength than sintered magnets. Therefore, according to an embodiment, high strength sintered magnets are used on the high speed side of the magnetic coupling 220 and lower strength bonded magnets are used on the low speed side. The variation in strength between the sintered and bonded magnets skews the magnetic field of the magnetic coupling 220 so that the strength of the magnetic field across the high speed side of the coupling varies only a little. Therefore heating inside the vacuum or low pressure space is reduced and instead almost all of the heating happens, and therefore almost all of the losses are incurred, on the air side of the magnetic coupling, away from the rotating flywheel. However such losses are at least partially accounted for and reduced by the use of bonded magnets on the low speed, air side of the coupling since bonded magnets have the effect, inter alia, of reducing eddy current losses.

An advantage of using a magnetic gear for the first 170 and/or second 181 clutch in the ePTO module 120 is that the magnetic gear allows the flywheel 112 and all the flywheel-side elements of the magnetic gear (which ideally would be placed in a vacuum with the flywheel 112) to be decoupled from the ePTO-side elements of the magnetic gear and from all other rotating elements on the airside, of the system, such as (at least part of) the rotating coupling member 130 and the electrical machine 190. This enables stored energy on the flywheel side to be conserved and protected from parasitic loss sources that will be present at the airside.

When the first 170 and/or second 181 clutch comprises a magnetic gear and when that magnetic gear is operating in its synchronous ratio region, the magnetic gear behaves as if it has fixed gear ratio as defined by the magnetic ratio of the inner and outer elements of the gear. It transmits power between the flywheel 112 and the variable ratio transmission device 182 in accordance with that fixed gear ratio. It is however possible to force the two rotating parts of the magnetic gear to desynchronise away from their synchronous ratio by applying a torque in either direction to the magnetic gear and thereby forcing it to exceed its dynamic torque capacity. This can be done when the magnetic gear is spinning. When this happens, the torque capacity of the magnetic gear will fall to a very low level. This will have the effect of effectively declutching the flywheel 112 from the potential parasitic losses of the gear.

As described above in relation to FIGS. 12a to 12f, in particular FIGS. 12a and 12b, when the flywheel is merely required to store rotational energy which it already contains and does not need to connect to the transmission of a vehicle, it can be disconnected from the rest of the system via the selected disengagement of the first 170 and/or the second 181 clutch as shown in FIG. 11. This selective disengagement of the flywheel from the ePTO 120 and other aspects of the arrangement is highly advantageous as it protects the flywheel from potential losses but at the same time is simply and easily reversible when the flywheel needs to be reconnected to the remainder of the system subsequently.

It is possible to use a brake on the low speed, rotational section of the magnetic gear (comprised within the first 170 and/or second 181 clutch) in order to break away the magnetic gear from its synchronous ratio and desynchronise its high and low speed sections. This has the effect of desynchronising the flywheel from the components on the opposite side of the magnetic gear, which may include the ePTO module 120 and/or the vehicle transmission, dependent on whether the magnetic gear is comprised within the first 170 or second 181 clutch.

Alternative or additionally, it is possible to use the ePTO electric machine 190 in order to desynchronise the inner and outer elements of the magnetic gear, of the first 170 or second 181 clutch, in order to disconnect the flywheel from the remainder of the system. Additionally or alternatively, the flywheel hybrid transmission or variator 182 as shown in FIG. 11 can be used to desynchronise the inner and outer elements of the magnetic gear, or another system clutch could be used.

Reducing the speed of the low speed section of the magnetic gear using a brake, the ePTO or transmission can be done at a rate which requires a torque to be transmitted across the magnetic gear which is above its dynamic torque capacity. The magnetic gear will, once such a torque is applied thereto, slip away from its synchronous ratio. Once the magnetic gear has completely desynchronised, the torque transmitted by the brake, ePTO or transmission will be significantly reduced and the flywheel will be decoupled from the losses on the other side of the system, hence reducing parasitic losses on the gear. It is highly useful in practical terms for the flywheel to be decoupleable from other aspects of the system in this manner.

When power transmission is required, such that the flywheel 112 should be reconnected to the rest of the system, the ePTO electric machine 190 may be reused to resynchronise the elements of the magnetic gear to the synchronous ratio, thereby reconnecting the flywheel to the drive side of the system. Alternatively or additionally, the input and output elements of the magnetic gear may be resynchronised using magnetic drag on the magnetic gear.

In addition or as an alternative, external magnetic fields can be applied to a magnetic gear comprised within the first 170 and/or second 181 clutch in order to selectively synchronise or desynchronise the input and output elements (i.e. the high speed and low speed sections) of the magnetic gear, from its synchronous ratio, thereby connecting or disconnecting respectively the flywheel from the drive side of the arrangement shown in FIG. 11. Using externally applied magnetic fields, for example by applying an electromagnet or influencing a magnetic field of the magnetic gear using a ferromagnetic shield, can have the effect of desynchronising the magnetic gear. In such a method, the dynamic torque capacity of the magnetic gear is reduced momentarily, or for a limited time period that may be predetermined, as a result of which the magnetic gear desynchronises because it can no longer hold its synchronous ratio against normal system drag torques.

Furthermore, externally applied magnetic fields may be used to soften the synchronisation or desynchronisation of the input and output elements of the magnetic gear to reduce wear and tear on the system and to reduce noise from vibrations that can occur during connection or deconnection of the flywheel from the rest of the system. For example, electromagnets may be provided which can be switched on when required to apply fields along the stator pins of the magnetic gear, in order to apply external magnetic fields thereto, possibly to saturate the stator pins.

External magnetic fields may be applied radially or axially into a magnetic gear. If the magnetic gear is arranged axially, its high and low speed sections will rotate together in parallel, preferably either side of a vacuum barrier. With such an axial arrangement the magnetic gear can be desynchronised as described above and/or the two rotating sections of the magnetic gear can be physically slid apart axially to reduce their torque capacity and thereby desynchronise them from one another.

The combination of the use of an ePTO module with a flywheel and that ePTO module including at least one magnetic gear results in a highly useful and user friendly system. The flywheel within that system can be selectively engaged and disengaged from the machine part of the ePTO module, and from drive transmission elements within a vehicle. Therefore, when necessary, the flywheel can be used in isolation to store energy, protecting it from losses and other possible damages that can arise within the rest of the system, and on the other hand the flywheel can be reconnected quickly and easily when it is needed to work in conjunction with the electric machine and/or with the transmission.

Alternative Arrangements

In other embodiments according to the invention, as shown in FIGS. 13a to 13f, there exist a number of possible variations on the above-described arrangement.

Figure 13A:
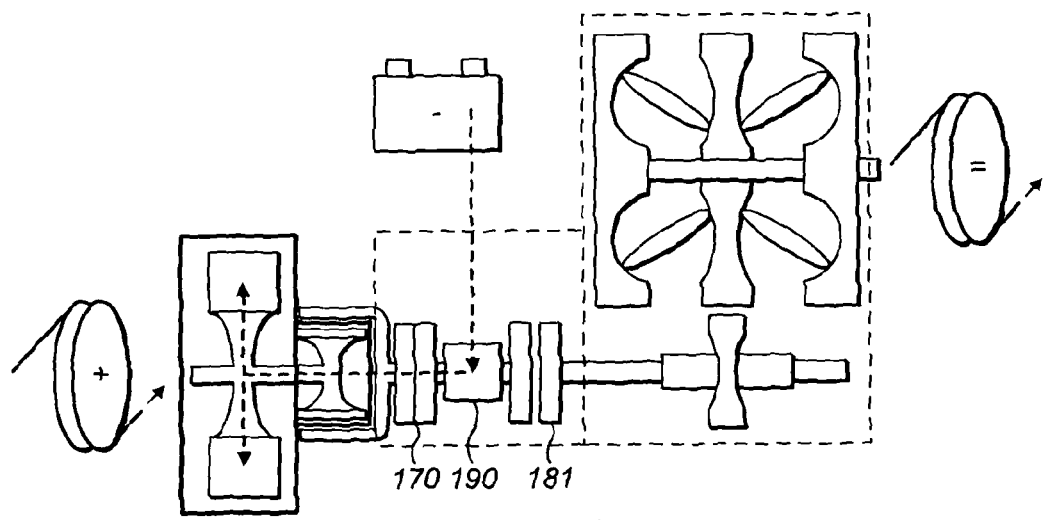
FIG. 13a shows an alternative system arrangement with an on-axis electrical machine.

As shown in FIG. 13a, in another embodiment the electrical machine 190 is arranged concentrically with the second section of the coupling member 132. In such an arrangement, the primary and secondary gears 171,172 are omitted and therefore the electrical machine 190 is required to operate at the speed at which the flywheel coupling device 116 operates (which may be the same as the flywheel speed, or lower than the flywheel speed), rather than at a stepped-up or stepped-down speed as provided by the primary and secondary gears 171,172 in FIG. 11. The omission of the gears results in reduced cost and complexity, and potentially increased service life due to fewer moving parts, however the primary and secondary gears 171,172 in FIG. 11 allow for torque and speed matching of the electrical machine 190 with the flywheel 112 and transmission 182. The flywheel coupling device 116, in some embodiments, incorporates gearing so as to allow the flywheel 112 which operates inside a vacuum, to spin at a higher speed than the exterior of the coupling device 116 which couples to the rest of the system and runs in air. This helps to reduce windage losses due to air friction.

Figure 13B:
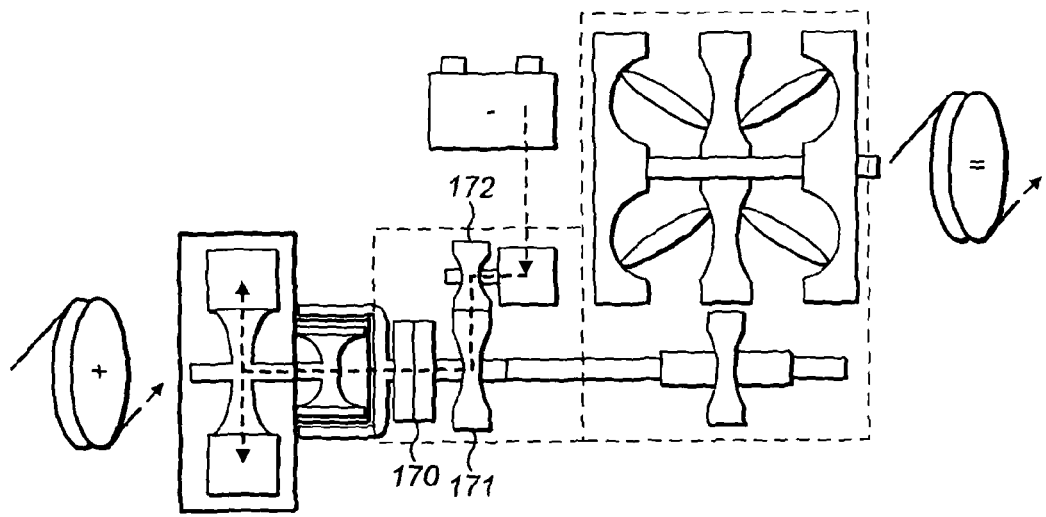
FIG. 13b shows an alternative system arrangement without the optional second disconnect clutch 181 of FIG. 11.

As shown in FIG. 13b, in a further embodiment the second clutch 181 is omitted. In such an embodiment, the transmission layshaft 191 therefore rotates whenever the electrical machine 190 rotates. This may increase frictional losses, however if an IVT is used then the transmission mainshaft (output shaft) 160 is not required to rotate while the electrical machine rotates (if the IVT in the "geared neutral" condition), therefore with an IVT the losses may be mitigated to an extent, depending upon the design of the IVT. The second clutch 181 in FIG. 11 avoids such losses. Even without the second clutch 181, the flywheel can still be disconnected from the system by the first clutch 170, thereby allowing for as long term energy storage as possible. Note that the second clutch 181 is still advantageous when used with an IVT, since an IVT usually does not have two "geared neutral" conditions, i.e. one geared-neutral condition where the input shaft can rotate while the output shaft remains still, and a second geared-neutral condition where the output shaft can rotate while the input shaft remains still. By incorporating the second clutch 181 it becomes possible to stop the electrical machine 190 while the gearbox output shaft 160 is rotating, e.g. when the vehicle is in motion and the flywheel control clutch 89 is engaged.

Figure 13C:
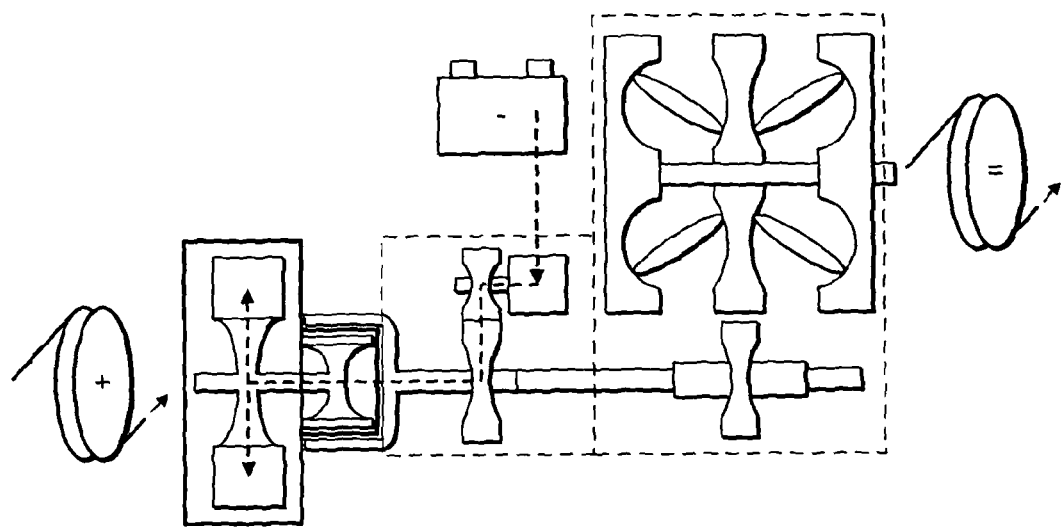
FIG. 13c shows an alternative system arrangement without either of the disconnect clutches 170,181 of FIG. 11.

As shown in FIG. 13c, in a still further embodiment both clutches 170,181 are omitted. The flywheel, electrical machine and transmission layshaft 191 rotate as one, although the flywheel coupling device 116 may incorporate a declutching function, thereby allowing the flywheel to be disconnected. An IVT transmission may mitigate to some extent the frictional losses associated with rotating the transmission mainshaft 160, depending upon the IVT implementation. Even with a CVT transmission, however, the flywheel control clutch 89 shown in FIG. 8c would allow the flywheel/electrical machine/transmission to rotate while the vehicle is stationary, albeit with increased frictional-induced losses of stored flywheel energy. The reduction of clutches and associated moving parts is advantageous however in reducing cost, complexity, which also potentially increasing reliability.

Figure 13D:
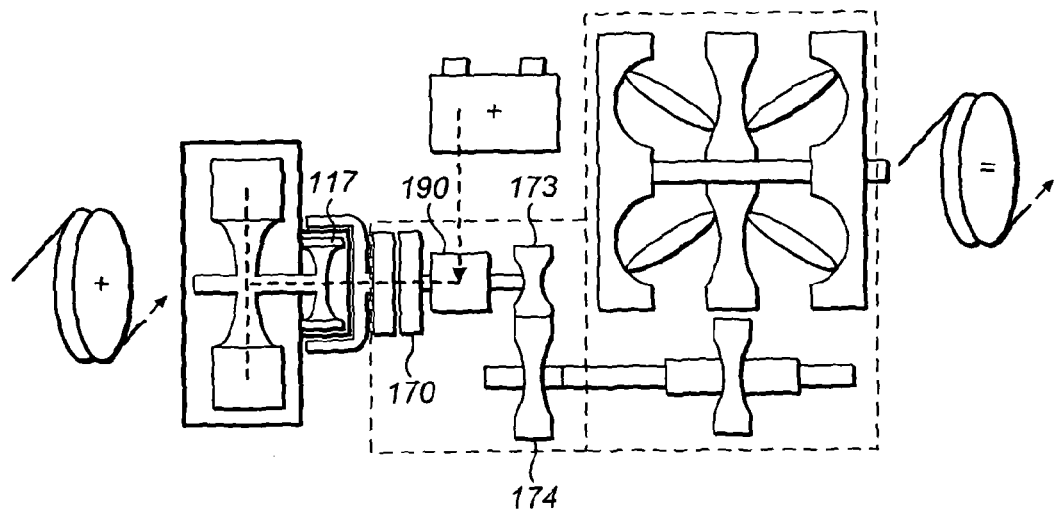
FIG. 13d shows an alternative system arrangement where the flywheel coupling has a 1:1 ratio therefore the electrical machine runs at flywheel speed.

Turning to FIG. 13d, another further embodiment is shown in which the electrical machine 190 is arranged concentrically on the coupling member 130, as in FIG. 13a, and also the transmission layshaft 191 is connected to the coupling member 130 via tertiary (third) and quaternary (fourth) gears 173,174. Thus, the electrical machine rotates at flywheel speed (the electrical machine is a high speed electrical machine), while the tertiary and quaternary gears 173,174 allow torque and speed matching of the flywheel 112 and electrical machine 190 to the transmission 182. The first disconnect clutch 170 allows the flywheel to rotate independently of the transmission 182 and electrical machine 190 when it is required that the flywheel 112 merely stores energy. During such time, the electrical machine 190 and battery 142 can be employed to store regenerative braking energy or provide torque assist to the vehicle's main propulsion means (e.g. an internal combustion engine).

Figure 13E:
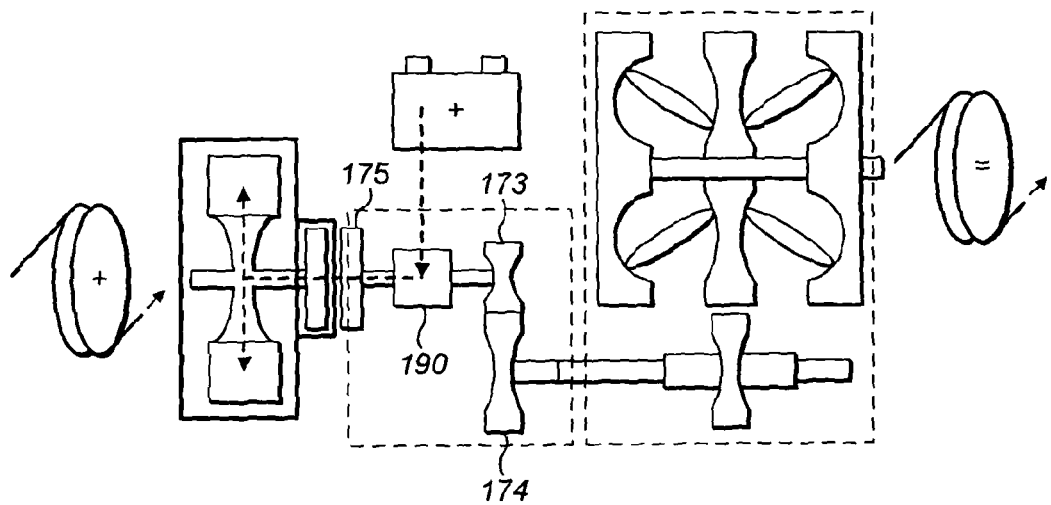
FIG. 13e shows an alternative system arrangement where the first disconnect clutch is a magnetic clutch.

Next, in FIG. 13e, according to yet another further embodiment, the first clutch 170 is replaced with a magnetic clutch 175, which in some embodiments is incorporated into the flywheel coupling device 116. The flywheel coupling device can also include gearing, such as magnetic gearing, so as to allow the flywheel to rotate faster (in its vacuum enclosure) than the electrical machine.

Figure 13F:
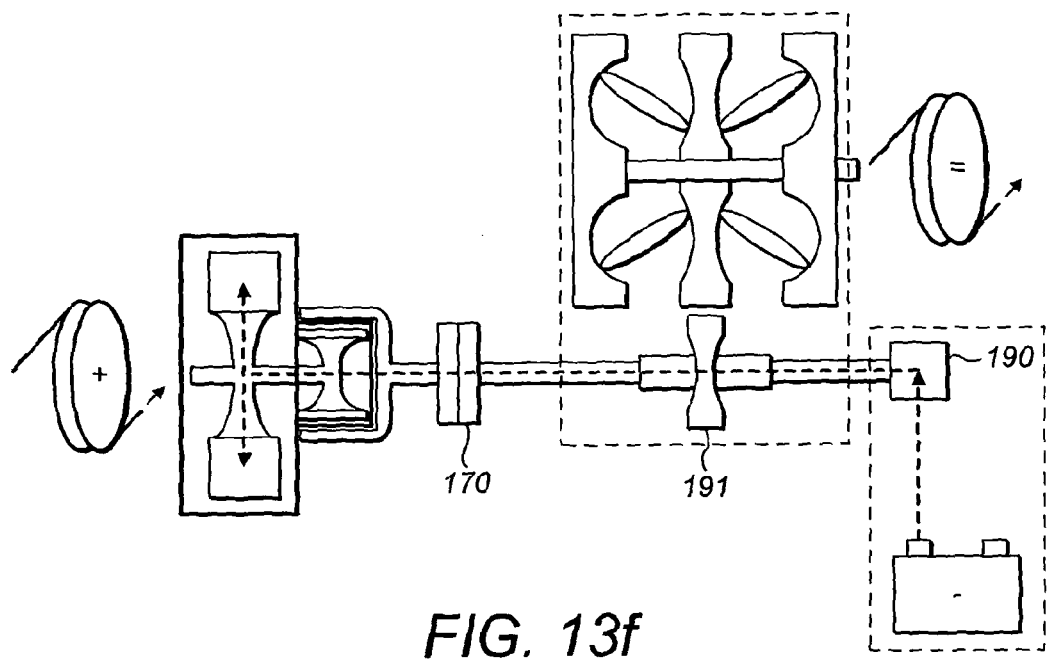
FIG. 13f shows an alternative system arrangement where the electrical machine is arranged on the layshaft of a constantly variable transmission (CVT).

Finally, in a further alternative embodiment, as shown in FIG. 13f, the electrical machine 190 can be arranged concentric with the transmission layshaft 191, on the opposite side of the transmission 182 compared with the electrical power take-off module 120. This arrangement has the advantage that physical packaging is more advantageous for some applications, since the flywheel 112 is provided on one side of the transmission 182, while the electrical machine 190 is provided on the other side of the transmission 182, thereby balancing space requirements on either side of the transmission 182. The shown embodiment has the electrical machine running at layshaft 191 speed, without gearing, but another possibility is for the electrical machine 190 to be connected to the layshaft 191 via gears so as to provide for torque and speed matching. Similarly, the flywheel could be connected to the layshaft 191 via separate gears so as to provide for torque and speed matching, independently of the gearing for the electrical machine 190. Another alternative is for the (or an additional) electrical machine 190 to be coupled to the transmission mainshaft (output shaft) 160, and thereby the electrical machine would rotate at vehicle transmission speed and provide synchronising capability to the gearbox mainshaft 160 (and to the gearbox layshaft 191 and connected components, depending on the currently selected transmission ratio).

In-Flywheel Electrical Machine

Another configuration (not shown) used in some embodiments, and which is an adaptation of the scheme shown in FIG. 13*d* or 13*e*, is to incorporate the rotor of the electrical machine 190 into the flywheel 112 so that the rotor runs at flywheel speed (high speed). Thus, if the flywheel 112 runs in a vacuum, so does the rotor of the electrical machine 190. In this embodiment there are no clutches between the flywheel and the electrical machine 190. The electrical machine 190 in such an embodiment is arranged to have low rotor losses, so as to avoid overheating of the rotor when it runs in a vacuum (such machines are available). The stator coils of the electrical machine 190 are placed outside of the vacuum so as to aid cooling.

Such an embodiment has a very high speed (flywheel speed) electrical machine, having advantages of reduced size for a given power due to the increased speed/reduced torque. The machine can therefore be made more compact.

An electric vehicle typically requires an average power input so as to maintain motion (for example 4 kW), but occasionally requires additional peak power for acceleration (which can be mechanically supplied from the flywheel momentum), or supplies regenerative braking power back to the flywheel for storage. Such an embodiment could be operated in the following manner.

The battery 142 supplies electrical energy to the flywheel via the integrated electrical machine rotor (as described above), at a level which corresponds to the average power level required to maintain the vehicle at a certain speed. Energy is supplied by the mechanical coupling member 130 to the variable-ratio transmission 182 and from there to the rest of the vehicle transmission. If the vehicle is required to accelerate or is driving uphill, the variable-ratio transmission is controlled so as to reduce the speed of the flywheel 112, thereby extracting the necessary additional energy which is required for accelerating the vehicle, and supplying that energy to the vehicle transmission. Conversely, under braking conditions or downhill driving, the vehicle transmission requires less than the average power level being supplied from the battery 142 to the flywheel via the electrical machine 190. In such conditions, the gear ratio of the variable—ratio transmission 182 is adjusted so as to speed up the flywheel 112, thereby the excess energy is stored in the flywheel 112.

Under the above scheme, the battery 142 supplies average vehicle motive power and the flywheel 112 supplies or sinks peak power demand. Thus, battery discharge rates can be kept within much narrower limits than in conventional hybrid vehicles which use battery power alone for driving electric motors. In such conventional vehicles, the batteries must be specified for peak power delivery, thereby increasing cost. By the above described embodiment, the peak power delivery required of the battery 142 is the average power required for cruising (or at least closer to it), such that a smaller, cheaper battery 142 can be specified. Battery life is also improved due to reduced heating and degradation effects due to charge cycling. This is because the flywheel 112 supplies peak and transient power demands, and the battery is therefore only used for average (lower than peak) power supply demands and for longer-term energy storage (rather than being used for transient power storage which would imply rapid and frequent charge/discharge cycling).

Variator and Device Configuration Options

It will be appreciated that the choice of variator type and the device layout or configuration options for the described aspects are not limited to those as specifically described or illustrated herein. Instead, any suitable device choice and layout may be implemented according to the requirements to be met for a particular vehicle, engine, machine or other apparatus.

The function of a variator device is to match the speed of a flywheel to the speed at the mechanical coupling point at which a flywheel is coupled to the output of an ICE or other output means. In effect, the variator is a power translator. That is, power in the flywheel embodiments discussed above is proportional to torque multiplied by angular speed. The function of the variator or other power translator used is to translate high torque and low speed at one side thereof to low torque and high speed at the other side of the power translator.

Both the choice of mechanical coupling point and the variator design impact on the functionality of a flywheel assisted system according to the aspects described herein. The variator options for those aspects in which a variator is utilised include a belt type continuous variably transmission (CVT), a traction type CVT, a mechanical split path infinitely variable transmission (IVT), an electrical split path IVT, a hydrostatic CVT/IVT and one or more electrical motors. Indeed, the system could even be air-driven. It is also possible for the variator to be a non-IVT power split CVT (a CVT combined with planetary gears) which is advantageous because it can be configured so that the majority of the power is transferred through the planetary gearing and only a smaller percentage of the power flows through the less efficient and potentially less durable CVT path. Thus, efficiency and wear tolerance are improved with such a power split CVT variator choice.

Figure 9A:
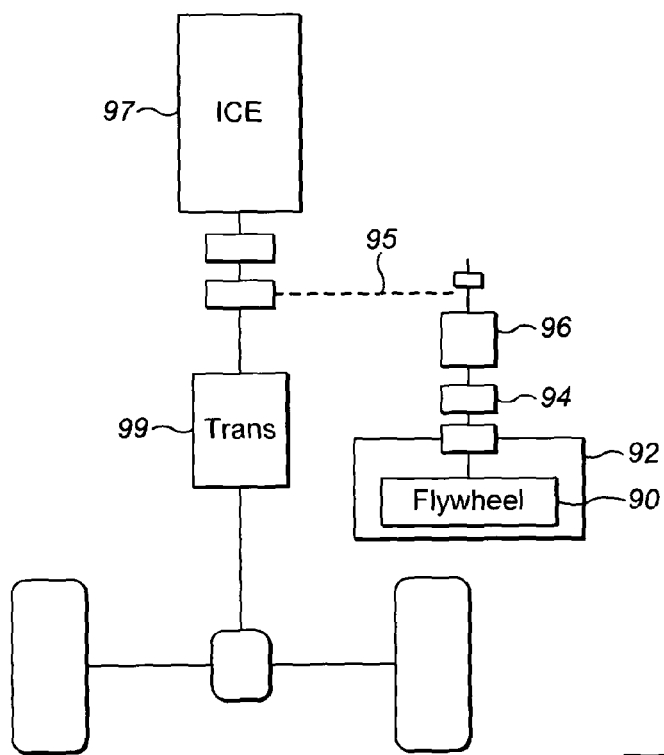
FIG. 9a shows a possible arrangement of an auxiliary flywheel device coupled to an ICE.

FIG. 9*a* shows a possible flywheel and variator layout that could be used, for example, for torque fill-in purposes. The flywheel 90 is preferably arranged in a vacuum 92. The flywheel 90 connects to a coupling clutch 94 by any suitable coupling means. The coupling clutch 94 provides a connection between the flywheel 90 and a variator device 96. The variator device 96 is, in turn, mechanically coupled to the transmission input of a vehicle, between the internal combustion engine 97 and the transmission 99.

Figure 9B:
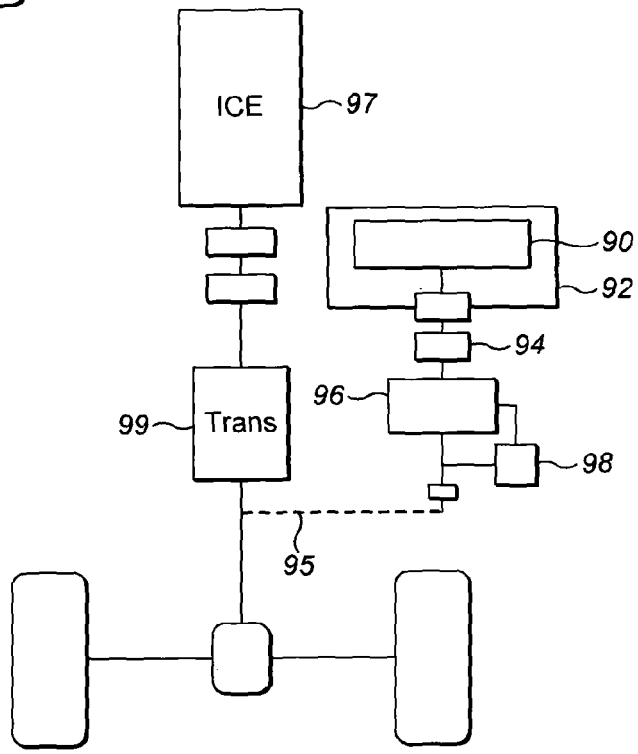
FIG. 9b shows an alternative arrangement of an auxiliary flywheel device coupled to an ICE, using a split path IVT layout.

FIG. 9*b* shows an alternative layout comprising a split path IVT. Again, a flywheel 90 is provided preferably in a vacuum 92 and is in connection with a coupling clutch 94, which in turn connects to a variator. The variator device used in this arrangement includes epicyclic stages 96 and an inline traction variator 98. The inclusion of an IVT variator system improves the potential functionality of the flywheel assisted engine, providing increased recovery range at low speed and also enabling launch boost.

It will be seen that in FIG. 9*b* the variator device is mechanically coupled to the output of the ICE 97 but, unlike the arrangement shown in FIG. 9*a*, is coupled at the output of the transmission 99. As mentioned above, this choice of mechanical coupling point can have an impact on the functionality and associated advantages of a flywheel-assisted system.

Figure 10A:
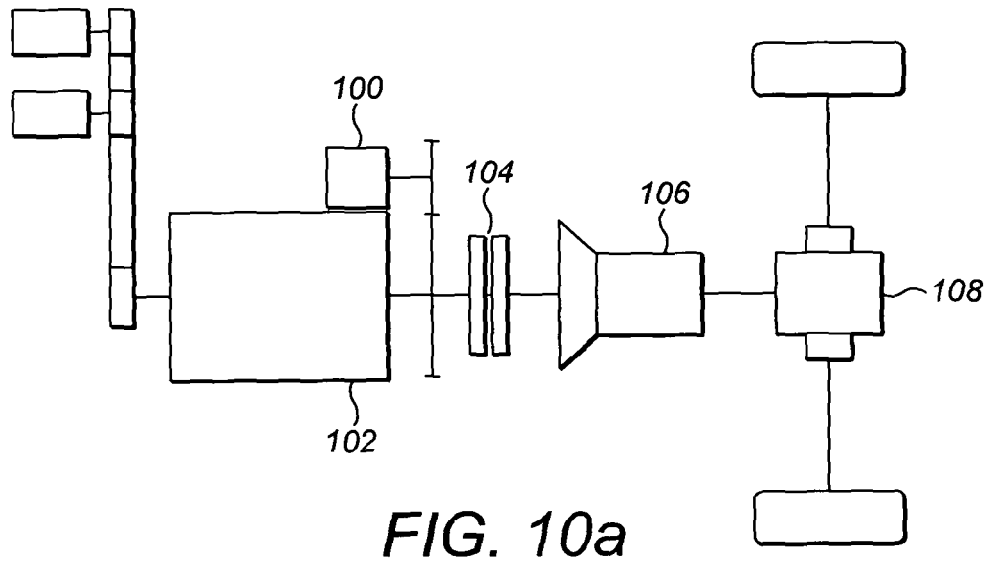
FIG. 10a shows an arrangement wherein a flywheel device is coupled to an ICE upstream of the main vehicle clutch and transmission.
Figure 10B:
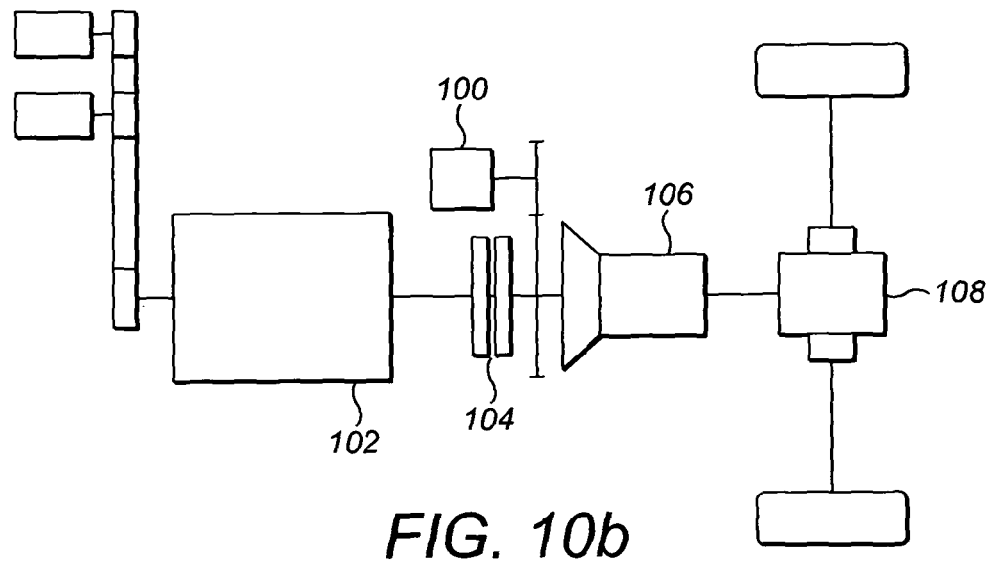
FIG. 10b shows an arrangement wherein a flywheel device is coupled to an ICE at a transmission input.

FIGS. 10*a* to 10*b* further illustrate potential coupling configuration options for flywheel assist according to the presently described aspects.

In FIG. 10*a* an auxiliary flywheel device 100 is coupled to the ICE 102, upstream of the main vehicle clutch 104 and transmissions 106. This coupling configuration provides an advantage in that a relatively narrow ratio range is needed across the variator device between the ICE 102 and the flywheel 100 in order to match flywheel speed to the speed at its coupling point with the ICE 102. That is, because the engine rotates at a higher speed than the wheels, the ratio difference between the flywheel and engine is less than that between the flywheel and the wheels. Also, the large, powerful gears needed for the transition between the flywheel and the ICE are already present in the transmission, but are not present lower downstream.

The arrangement in FIG. 10a furthermore reduces variator torque by utilising the torque advantage of the transmission. However, because the flywheel is coupled upstream of the clutch 104, the clutch 104 must be closed to recover and reuse energy from the flywheel 100 in the vehicle driveline 108. Therefore energy recovery from the flywheel 100 is interruptible by gearshifts. Furthermore, power shift transmission is required in this arrangement in order to enable continuous drive and regenerative braking using the flywheel device 100 for mechanical energy storage.

FIG. 10b shows an alternative coupling configuration similar to that shown in FIG. 9a, wherein the flywheel 100 is coupled to the transmission input, between the clutch 104 and the transmission 106. As with the arrangement in FIG. 10a, the configuration in 10b provides an improved useable range due to the compatible transmission ratios between the ICE 102 and the flywheel 100. And it also enables reduction of variator torque. However, decoupling is still required during gearshifts in order for energy recovery and/or reuse from the flywheel 100 during gearshift manoeuvres.

Figure 10C:
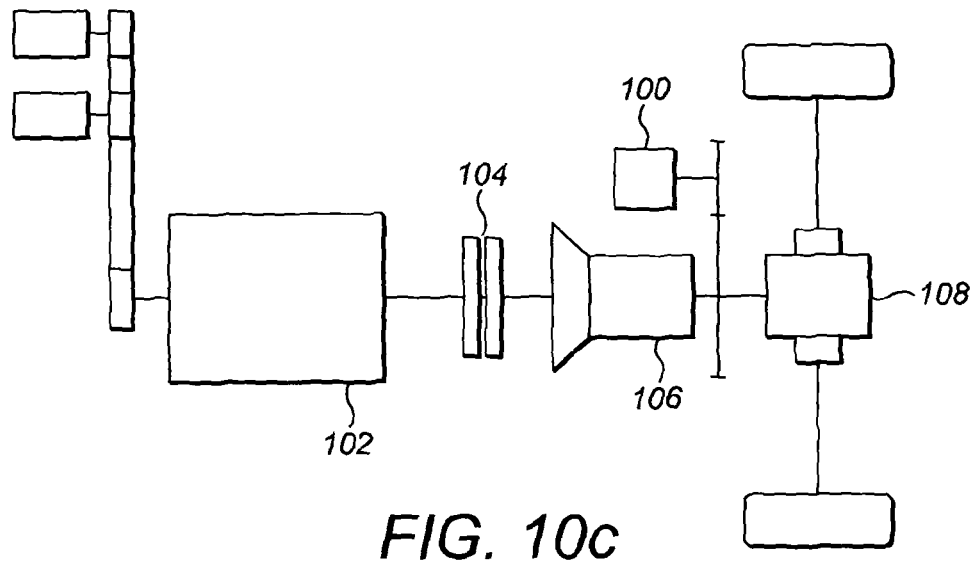
FIG. 10c shows an arrangement wherein a flywheel is coupled to an ICE at its transmission output.

FIG. 10c illustrates another possible coupling configuration wherein the flywheel 100 is coupled at the transmission output. This arrangement is advantageous since the energy recovery from the flywheel 100 is not interrupted by gearshifts. Furthermore, there is potential for a flywheel only mode, wherein the flywheel 100 is the sole energy source and energy does not come from the ICE 102, which is possible as long as the main clutch 104 is open. However the configuration in FIG. 10c has a reduced overall range of operation as compared to the configurations of FIGS. 10a and 10b and it also requires increased coupling torque at the variator output.

Figure 10D:
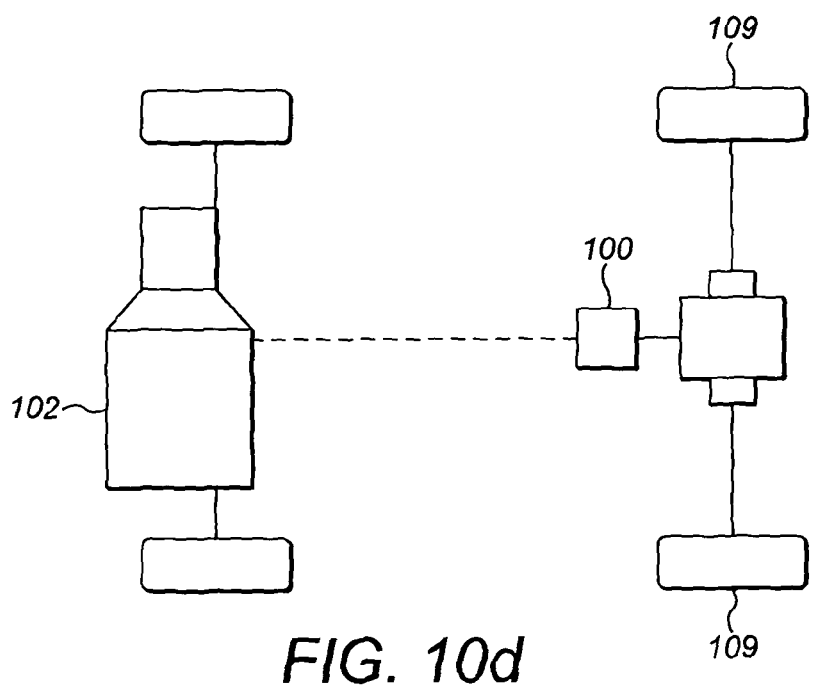
FIG. 10d shows an arrangement wherein a flywheel is coupled to a rear axle system.

FIG. 10d shows a rear axle system wherein the flywheel 100 is provided between the engine 102 and the rear wheels 109 of a vehicle. As with the arrangement as shown in FIG. 10c, this configuration is advantageous since energy recovery from the flywheel is not interrupted by gearshifts and there is potential for a flywheel only mode as long as the main clutch is open. Furthermore the flywheel 100 may be used for four wheel drive assist or for part time four wheel drive functionality. Thus the flywheel 100 could assist in diversifying the suitability of a vehicle for different driving conditions. However, as with the configuration shown in FIG. 10c, the configuration in FIG. 10d has a reduced overall operating range and requires increased coupling torque at the variator output as compared to the configurations shown in FIGS. 10a and 10b.

A further use of a flywheel in a suitable configuration as discussed above is in launch support. Dependent on the vehicle type and the engine load map, the flywheel may be the sole torque supply for launch or may be used in conjunction with the engine torque supply. For example, for a relatively small vehicle in a situation such as in a queue of traffic, nudging forward at regular intervals, the flywheel could be sufficient to supply torque for launch of the vehicle for each nudge forward. Alternatively, for a larger vehicle or for longer or higher-speed movements of a smaller vehicle, the flywheel could be used in conjunction with part of the engine capability, for example using two engine cylinders out of the four available. An appropriate control strategy can be put in place so that the optimum combination of flywheel and engine torque supply is used at any given time taking into account vehicle factors and potentially also environmental factors such as emissions restrictions in particular areas. Another factor in the suitability of the particular variator or coupling configuration according to the presently described aspects is the speed of the flywheel itself during operation. The kinetic energy stored within a flywheel at any given time is directly proportional to the square of its speed ($E \alpha \omega^2$). Therefore if for example half the stored energy is extracted from a high-speed flywheel this will cause a smaller percentage speed drop in the high-speed flywheel as compared to taking out half the energy from a low-speed flywheel. It follows that a faster flywheel helps to reduce the required ratio range of the variator device being used for coupling that flywheel to an ICE.

Variants

It will be appreciated that the flywheel arrangements as described herein are not mutually exclusive but can be implemented in any suitable combination in a vehicle, machine or other apparatus. Some or all of the features and/or details from any of the above-described arrangements may be incorporated in other respective arrangements, where applicable. For example, an engine layout may include a relatively small flywheel to be used for any or all of: driving a supercharger, charging a chemical battery, and providing an auxiliary energy supply or recovery in addition to that which is provided by the main power source during vehicle start or stop events. The same engine configuration could also include a relatively large flywheel for use in direct and/or hybrid drive of the vehicle wheels.

It is possible for any flywheel as described herein to be configured such that, on switch off of the vehicle or the equipment, the flywheel is run down and in doing so charges a chemical or other long term battery storage means.

Dependant on the particular requirements to be met or restrictions to adhere to, a flywheel may be included in an engine or machine during manufacture or retro-fitted to an existing engine or machine after manufacture, in a number of different configurations.

Thus a plurality of arrangements are provided herein, in each of which a flywheel is implemented in an engine, vehicle, machine or apparatus in order to advantageously harness the available energy therein and use it to improve overall performance and output. There are no additional energy sources required to run or charge the flywheels, but instead it is recognised herein that energy which is dissipated in conventional systems can instead be usefully captured, stored and reused using a suitable flywheel arrangement. Furthermore, the flywheel arrangements herein may be suitably manipulated and controlled in order to meet changing operating conditions and user requirements over time in a straightforward and energy efficient manner.

It has been recognised herein that energy can most often be recovered in a vehicle or machine in kinetic form and thus, by using a flywheel to store energy also in kinetic form, reduce or avoid energy dissipation due to energy conversion stages. The flywheel can store energy in kinetic form over an extended period of time and, furthermore, can be used to supply energy in kinetic or other forms to other energy storage devices according to conditions over time, for example, during engine switch off.

According to an aspect there is provided a method of operating energy storage apparatus, the apparatus comprising a vehicle transmission which is mechanically couplable to a flywheel to drive the flywheel and be driven thereby, and an electrical machine which is also mechanically couplable to the flywheel to drive the flywheel and be driven thereby, the electrical machine electrically connected to electrical energy storage means, the method comprising the steps of before operation of a vehicle comprising the apparatus, spinning up the flywheel by operating the electrical machine as a motor to discharge the electrical energy storage means; and/or after operation of the vehicle, spinning down the flywheel by operating the electrical machine as a generator to charge the electrical storage means.

According to an aspect there is provided a method of operating energy storage apparatus, the apparatus comprising a vehicle transmission which is mechanically couplable to a flywheel to drive the flywheel and be driven thereby, and an electrical machine which is also mechanically couplable to the flywheel to drive the flywheel and be driven thereby, the electrical machine electrically connected to electrical energy storage means, the method comprising the steps of: operating the electrical machine as a motor to discharge the electrical storage means whilst coupling the electrical machine to the vehicle transmission to provide power to the vehicle transmission; and coupling the flywheel to the vehicle transmission to provide additional power to the vehicle transmission or to absorb excess power from the vehicle transmission.

The power may be provided to the vehicle transmission from the flywheel is performed during peak power demand by the vehicle transmission. Peak power demand may occur during acceleration of a vehicle comprising the vehicle transmission, or when the vehicle is travelling up an incline. Absorbing excess power from the vehicle transmission may be performed during braking of a vehicle comprising the vehicle transmission, or when the vehicle is travelling down an incline.

The flywheel may additionally be charged by the electrical machine operating as a motor, using stored electrical energy, during periods when there is substantially little or no energy being supplied to the flywheel from the vehicle transmission. The electrical energy storage means may be charged by the electrical machine operating as a generator, so as to at least partially absorb the excess power from the vehicle transmission.

The apparatus may comprise at least one disconnect-type clutch having two selectively engageable halves, wherein the rotational speed of at least one half of the clutch may be controlled by operating the electrical machine as a motor or generator, so as to synchronise the two halves of the clutch. The synchronisation may be performed before the one clutch is engaged.

The electrical storage means may be recharged using energy from the flywheel or vice versa.

A minimum charge level may be maintained in the flywheel and/or the electrical storage means in operation.

The flywheel arrangements described herein provide substantial advantages over known arrangements by enabling enhanced efficiency and performance in a user friendly, cost effective, compact and environmentally friendly manner. They can be implemented in any suitable vehicle, engine, machine or apparatus in order to improve its output performance and meet user requirements in a manner not previously possible using prior art arrangements.

The invention claimed is:

1. An apparatus comprising:
  a flywheel for storing kinetic energy, the apparatus arranged for mechanically transferring energy between the flywheel and a vehicle transmission via a variable-ratio transmission; and
  an electrical machine arranged for conversion between mechanical energy and electrical energy,
  wherein the electrical machine is mechanically coupled to the flywheel via a first disconnect clutch, said first disconnect clutch comprising a magnetic coupling, and
  wherein the electrical machine is mechanically coupled to the variable-ratio transmission via a second disconnect clutch.

2. The apparatus of claim 1 wherein the electrical machine is coupled to the flywheel via first and second gears.

3. The apparatus of claim 1 wherein the electrical machine is concentrically arranged on an axis of the flywheel.

4. The apparatus of claim 1 wherein the flywheel is connected to a mechanical coupling member which is longitudinally split into two or more sections, wherein the disconnect clutch selectively couples the split sections.

5. The apparatus of claim 1 wherein the second disconnect clutch comprises a dog-engagement type, or frictional engagement type.

6. The apparatus of claim 1 wherein the second disconnect clutch comprises a magnetic coupling.

7. The apparatus of claim 1 further comprising an electromagnet, wherein said electromagnet is arranged for application of an external magnetic field to the magnetic coupling comprised within the first disconnect clutch.

8. The apparatus of claim 1 wherein the flywheel runs in a vacuum.

9. A method of operating the apparatus of claim 1,
  the method comprising storing energy in the flywheel and selectively disconnecting the flywheel from other parts of the apparatus, wherein said other parts comprise the electrical machine and/or the variable-ratio transmissions, wherein the step of selectively disconnecting the flywheel comprises desynchronising the rotation of first and second parts of the magnetic coupling from one another.

10. A method as claimed in claim 9 wherein the first part of the magnetic coupling comprises a low speed rotator and the second part of the magnetic coupling comprises a high speed rotator and wherein the step of desynchronising the rotation of the first and second parts of the magnetic coupling from one another comprises reducing the rotational speed of the low speed rotator below a threshold, wherein said speed reduction is achieved by applying a torque to the magnetic coupling.

11. A method as claimed in claim 10 wherein the torque which is applied to the magnetic coupling exceeds the dynamic torque capacity for the magnetic coupling.

12. A method as claimed in claim 10 wherein the torque is applied to the magnetic gear by any of:
  the electrical machine, the variable ratio transmission, a brake or a clutch.

13. A method as claimed in claim 9 further comprising applying an external magnetic field to the magnetic gear during desynchronisation of the first and second parts of the magnetic coupling from one another.

14. A method as claimed in claim 13 wherein the external magnetic field is applied to the magnetic coupling instantaneously or for a finite period of time, which may be predetermined.

15. A method as claimed in claim 13 wherein the external magnetic field is produced using an electromagnet.

16. A method as claimed in claim 9 wherein the step of desynchronising rotation of the first and second parts of the magnetic coupling from one another is achieved by influencing a magnetic field produced by the magnetic coupling using a ferromagnetic shield.

17. A method as claimed in claim 9 wherein the first and second parts of the magnetic coupling comprise first and second rotators with a common rotational axis, wherein the step of desynchronising rotation of the first and second parts of the a magnetic coupling from one another is achieved by physically separating the rotators from one another along said axis, in order to reduce their torque capacity.

18. A method as claimed in claim 9 wherein the method comprises selectively disengaging the first clutch and/or the second clutch during operation of the apparatus.

19. A method as claimed in claim 18 wherein said second disconnect clutch comprises a magnetic coupling.

20. A method as claimed in claim 9 further comprising the step of resynchronising the first and second parts of the magnetic coupling with one another in order to reconnect the flywheel to other parts of the apparatus.

21. The apparatus of claim 1 wherein the electrical machine is at least partially integrated with the flywheel.

22. The apparatus of claim 1 wherein a rotor of the electrical machine is integrated with the flywheel and runs in a vacuum with the flywheel.

23. The apparatus of claim 1, wherein the first disconnect clutch separates the flywheel from the electrical machine such that the flywheel can rotate independently of the electrical machine.

24. The apparatus of claim 1, wherein the second disconnect clutch separates the electrical machine from the variable-ratio transmission, such that the flywheel can rotate with the electrical machine and independently of the variable-ratio transmission.

* * * * *